(12) United States Patent
Subramanian et al.

(10) Patent No.: US 12,529,708 B2
(45) Date of Patent: Jan. 20, 2026

(54) CONSUMABLE COMPONENTS IN FLUIDIC SAMPLE DISPENSING SYSTEMS AND METHODS

(71) Applicants: ASP Health Inc., Evanston, IL (US); Northwestern University, Evanston, IL (US)

(72) Inventors: Hariharan Subramanian, Evanston, IL (US); Michael Verleye, Evanston, IL (US); Micah Litow, Evanston, IL (US); Chester Henderson, Box Hill (AU); Rebecca Bartel, Box Hill (AU); Penny Ho, Box Hill (AU); James Student, Box Hill (AU); Ben James, Box Hill (AU); Anthony White, Box Hill (AU); Michael Henning, Box Hill (AU); Volkan Susuzer, Box Hill (AU); Matthew Turner, Box Hill (AU)

(73) Assignees: ASP Health Inc., Northbook, IL (US); Northwestern University, Evanston, IL (US)

( * ) Notice: Subject to any disclaimer, the term of this patent is extended or adjusted under 35 U.S.C. 154(b) by 1012 days.

(21) Appl. No.: 17/600,629

(22) PCT Filed: Apr. 6, 2020

(86) PCT No.: PCT/US2020/026906
§ 371 (c)(1),
(2) Date: Oct. 1, 2021

(87) PCT Pub. No.: WO2020/206439
PCT Pub. Date: Oct. 8, 2020

(65) Prior Publication Data
US 2022/0214372 A1    Jul. 7, 2022

Related U.S. Application Data

(60) Provisional application No. 62/830,294, filed on Apr. 5, 2019.

(51) Int. Cl.
*B05B 7/08* (2006.01)
*G01N 1/31* (2006.01)
*G01N 35/10* (2006.01)

(52) U.S. Cl.
CPC ....... *G01N 35/1016* (2013.01); *B05B 7/0869* (2013.01); *G01N 1/31* (2013.01);
(Continued)

(58) Field of Classification Search
CPC ............. G01N 35/1016; G01N 1/31; G01N 35/1065; G01N 2001/317; G01N 2035/1023; B05B 7/0869
See application file for complete search history.

(56) References Cited

U.S. PATENT DOCUMENTS 5,264,036 A  *  11/1993  Haas .................... B05C 5/0279
                                                134/122 R
5,425,918 A     6/1995  Healey et al.
(Continued)

FOREIGN PATENT DOCUMENTS

JP           S5712347         1/1982
JP           S57012347        1/1982
(Continued)

OTHER PUBLICATIONS

International Search Report and Written Opinion dated Jun. 23, 2020 for International Application No. PCT/US2020/026906.

*Primary Examiner* — Jill A Warden
*Assistant Examiner* — Michael Stanley Gzybowski
(74) *Attorney, Agent, or Firm* — Perkins Coie LLP

(57) ABSTRACT

Systems, devices, and methods for dispensing a of fluidic sample to each of a plurality of targets are disclosed. An example apparatus for dispensing a fluidic sample includes an inlet port to input a sample material, and a first sample nozzle and a second sample nozzle fluidically coupled to the inlet port to expel the sample material, wherein a tubular junction fluidically couples the inlet port to a first tubular fluid path that terminates in the first sample nozzle and to a second tubular fluid path that terminates in the second sample nozzle, wherein a cross-sectional area of the tubular (Continued)

junction is less than an average cross-sectional area of the first tubular fluid path and the second tubular fluid path, and wherein the cross-sectional area of the tubular junction is selected to draw the sample material from the inlet port into the tubular junction via capillary action.

16 Claims, 17 Drawing Sheets

(52) U.S. Cl.
CPC .................. *G01N 35/1065* (2013.01); *G01N 2001/317* (2013.01); *G01N 2035/1023* (2013.01)

(56) References Cited

U.S. PATENT DOCUMENTS

| | | |
|---|---|---|
| 6,263,745 B1 | 7/2001 | Buchanan et al. |
| 2015/0037385 A1 | 2/2015 | Shah et al. |
| 2016/0291045 A1 | 10/2016 | Czarnecki et al. |
| 2018/0374692 A1 | 12/2018 | Schürenberg |
| 2022/0276268 A1 | 9/2022 | Mendoza et al. |

FOREIGN PATENT DOCUMENTS

| | | |
|---|---|---|
| JP | 2004-518106 | 6/2004 |
| JP | 2009-162635 | 7/2009 |
| WO | WO 2006/005923 | 1/2006 |
| WO | WO 2015/023796 | 2/2015 |
| WO | WO 2018/022025 | 2/2018 |

\* cited by examiner

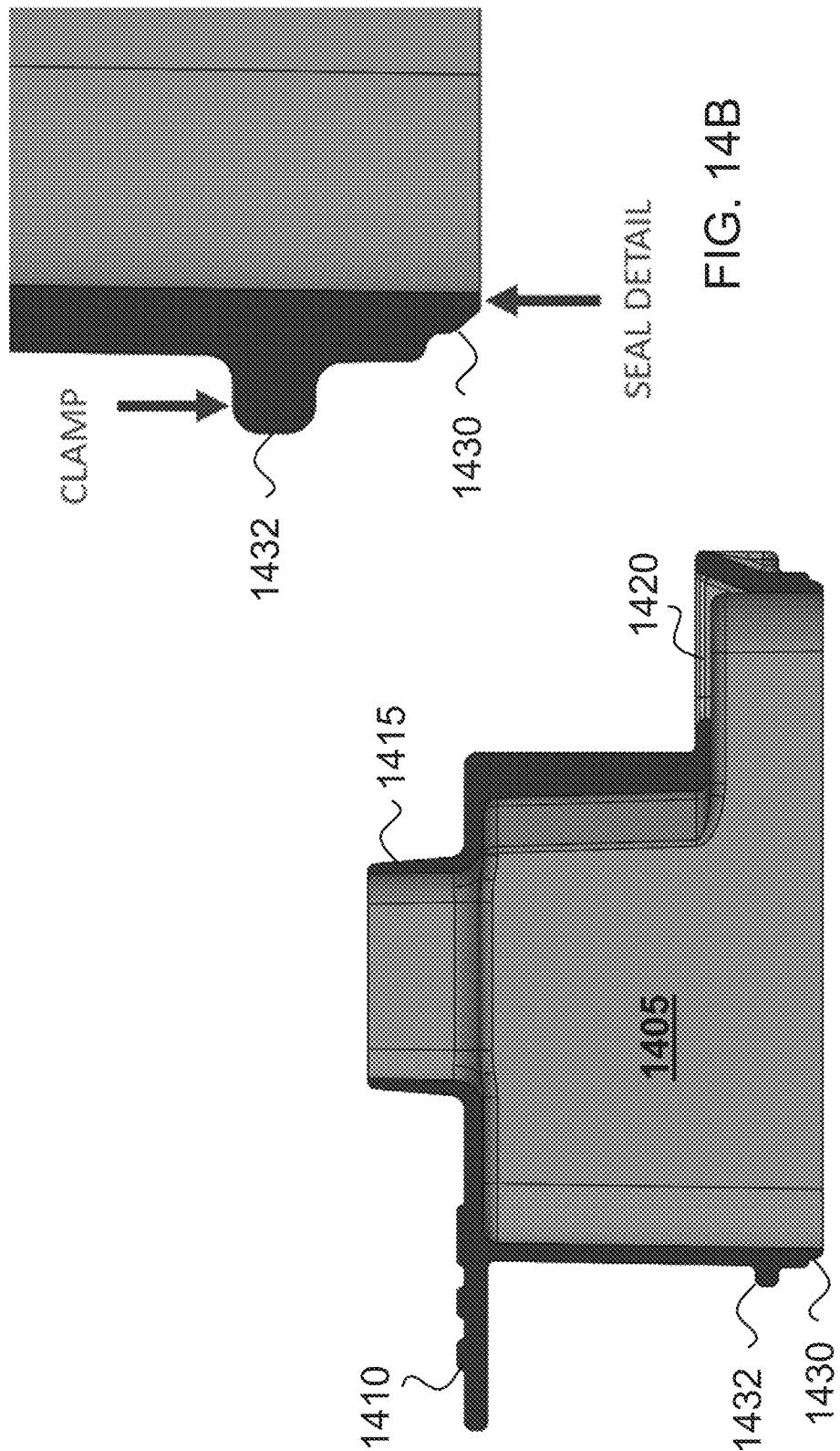

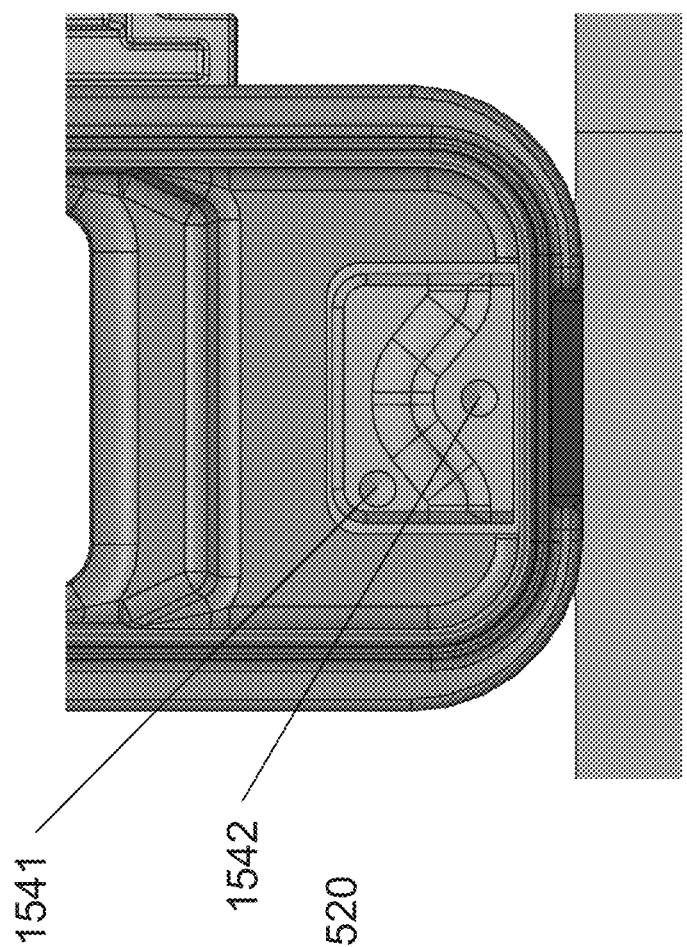
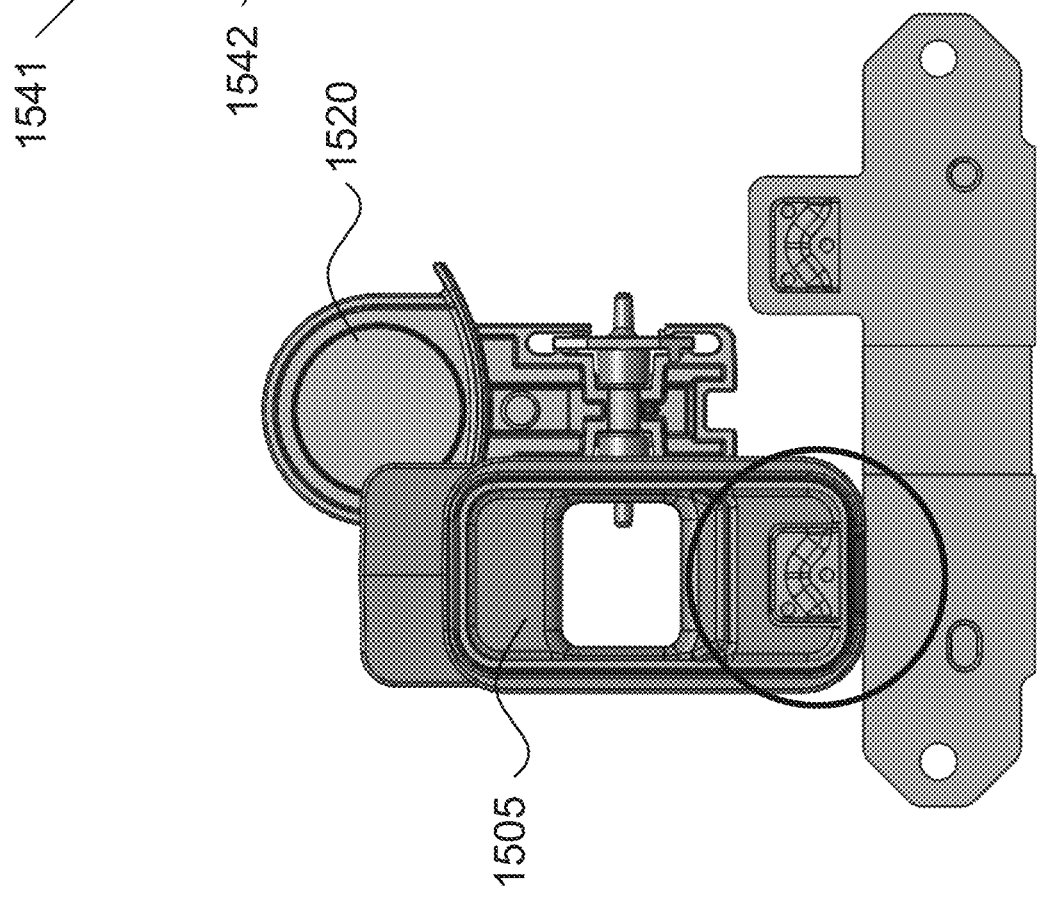
FIG. 15B
FIG. 15A

CONSUMABLE COMPONENTS IN FLUIDIC SAMPLE DISPENSING SYSTEMS AND METHODS

CROSS-REFERENCE TO RELATED APPLICATIONS

This application is a 35 U.S.C. § 371 National Stage application of International Application No. PCT/US2020/026906 entitled "CONSUMABLE COMPONENTS IN FLUIDIC SAMPLE DISPENSING SYSTEMS AND METHODS," filed on Apr. 6, 2020, which claims priority to U.S. Provisional Patent Application No. 62/830,294 which was filed on Apr. 5, 2019, the entire contents of which are incorporated herein by reference and relied upon.

TECHNICAL FIELD

The present disclosure relates to consumable components in systems, devices, and methods for dispensing a predetermined amount of fluidic sample.

BACKGROUND

Cytology techniques have developed to be minimally invasive and have revolutionized the practice of medicine. The ability to quickly obtain high quality samples with little discomfort has generally made such procedures more acceptable. More recently, sample collection techniques are adopting the use of consumable components that are designed to improve laboratory practices whilst ultimately delivering better patient care. Using consumable components reduces cross-contamination and improves reliability.

SUMMARY

Consumable components in systems, devices, and methods for dispensing substantially the same amount of fluidic sample to each of a plurality of targets are disclosed. In one example embodiment, a sample dispenser for dispensing substantially a same volume of liquid-based sample material to a plurality of targets, the dispenser comprising a first tubular structure having a first inner volume and a first inner perimeter, wherein (i) a first opening of the first tubular structure is disposed between a first gas nozzle and a first target, wherein the first gas nozzle is configured to expel gas towards the first target, and (ii) the first perimeter is selected such that capillary action can be induced to fill the first tubular structure with the liquid-based sample material via a second opening of the first tubular structure, and a second tubular structure having a second inner volume and a second inner perimeter, wherein (i) a first opening of the second tubular structure is disposed between a second gas nozzle and a second target, wherein the second gas nozzle is configured to expel gas towards the second target, (ii) the second perimeter is selected such that capillary action can be induced to fill the second tubular structure with the liquid-based sample material via a second opening of the second tubular structure, and wherein the first inner volume and the second inner volume are substantially the same, and the second opening of the first tubular structure is proximate to the second opening of the second tubular structure.

In another example embodiment, a system for sample analysis, comprising a first gas nozzle configured to expel gas towards a first target, a second gas nozzle configured to expel gas towards a second target, a target holder arranged to hold the first and second targets, and a sample dispenser for dispensing substantially the same volume of liquid-based sample material to the plurality of targets, the dispenser comprising a first tubular structure having a first inner volume and a first inner perimeter, wherein (i) a first opening of the first tubular structure is disposed between the first gas nozzle and the first target, and (ii) the first perimeter is selected such that capillary action can be induced to fill the first tubular structure with the liquid-based sample material via a second opening of the first tubular structure, and a second tubular structure having a second inner volume and a second inner perimeter, wherein (i) a first opening of the second tubular structure is disposed between the second gas nozzle and the second target, (ii) the second perimeter is selected such that capillary action can be induced to fill the second tubular structure with the liquid-based sample material via a second opening of the second tubular structure, and wherein the first inner volume and the second inner volume are substantially the same, and the second opening of the first tubular structure is proximate to the second opening of the second tubular structure.

In yet another example embodiment, an apparatus for dispensing a fluidic sample, comprising an inlet port to input a sample material, and a first sample nozzle and a second sample nozzle fluidically coupled to the inlet port to expel the sample material, wherein a tubular junction fluidically couples the inlet port to a first tubular fluid path that terminates in the first sample nozzle and to a second tubular fluid path that terminates in the second sample nozzle, wherein a cross-sectional area of the tubular junction is less than an average cross-sectional area of the first tubular fluid path and the second tubular fluid path, and wherein the cross-sectional area of the tubular junction is selected to draw the sample material from the inlet port into the tubular junction via capillary action.

In yet another example embodiment, a hood for improving deposition of a sample material on a target in a sample analysis system, the hood comprising a body comprising a top panel, a front panel, a left panel, a right panel and a back panel, wherein the top panel comprises a first opening configured to receive the sample material, a lower panel, positioned adjacent to the back panel, that is parallel to the top panel and perpendicular to the back panel, wherein the lower panel comprises a second opening to receive a stain or dye subsequent to the deposition of the sample material on the target, and a bottom rim that supports the body and the lower panel, wherein the bottom rim is configured to adhere to the target prior to the deposition.

The above and other aspects and their implementations are described in greater detail in the drawings, the descriptions, and the claims.

BRIEF DESCRIPTION OF DRAWINGS

FIGS. 14A and 14B illustrate an example of a sealing mechanism of the hood of FIGS. 13A and 13B.

FIG. 15A illustrates an example of the relative positions of a sample dispenser and a hood in relation to a portion of a sample analysis system.

FIG. 15B illustrates the hood connected to the sample analysis system.

DETAILED DESCRIPTION

Biological tissue samples are collected from patients for microscopic and molecular diagnostic analysis for clinical, diagnostic and research applications. These samples are collected in a variety of laboratory, medical clinic and other health-care or medical research settings. For example, cells/tissue can be collected from a patient using a collection device, such as a brush, swab or cutting tool for biopsies and placed into liquid in a sample container. When ready to prepare microscopic slides for screening and/or diagnosis, the sample liquid is drawn by vacuum through a filter. A microscope slide is pressed against the filter to transfer cells onto the slide for viewing and analysis. Alternatively, the sample liquid may be transferred from the sample vial to a glass slide via a pipettor or other suction-type devices. Other, non-liquid-based approaches for viewing cells under microscope include directly smearing cells or tissues onto the surface of the slide with the collection device.

In certain situations, it may be desirable to prepare a plurality of slides in substantially the same manner. For example, by preparing two or more slides in the same manner, a user can repeat an analysis or a test to improve reliability of the result. In another example, one of the prepared slides can be used as a control slide. In yet another example, the slides can be processed at different times after undergoing the same process or different processes. In yet another example, one of the slides can undergo a conventional histological staining while the other slide can undergo a molecular staining process. In yet another example, one of the slides can be reviewed on-site to quickly ascertain the adequacy of the samples while the other slide can be processed in the laboratory for a detailed cytological analysis of the specimen. Preparing a plurality of slides, using any of the above described methods, typically uses consumable components to reduce cross-contamination and improve reliability.

In various embodiments, consumable components for systems, devices, and methods that are capable of automatically and concurrently depositing substantially the same amount of fluidic sample to each of a plurality of targets, such as slides, are described. The consumable components include a specimen input port (SIP), which enables the fluidic sample to be deposited on the target, and a hood, which contains the sample to be deposited within the target area and eliminates the unintended dispersion of the aerosolized sample.

Examples of a Sample Analysis System

Figure 1A:
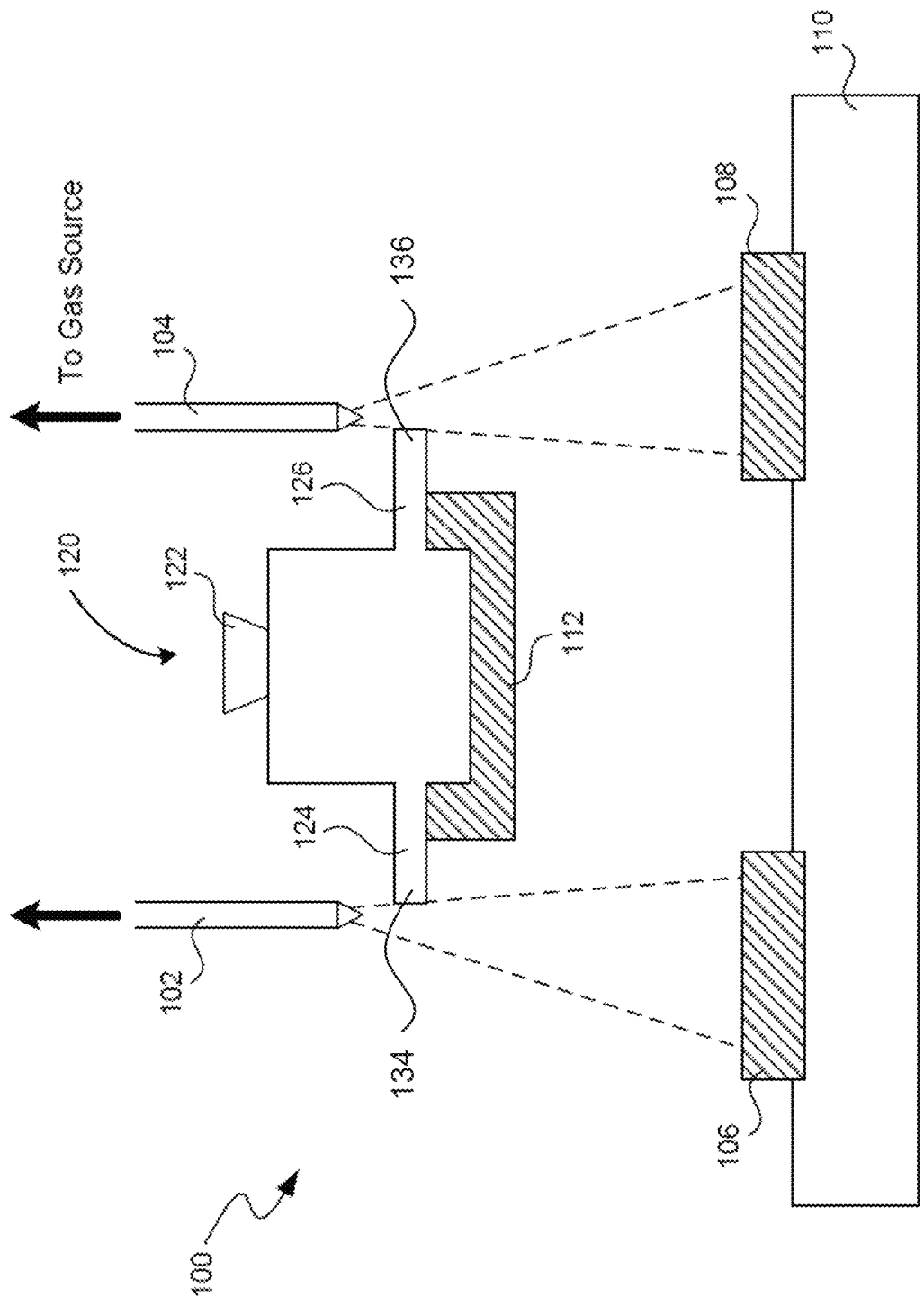
FIG. 1A illustrates an example of a sample analysis system.

FIG. 1A illustrates an example of a sample analysis system 100. As shown therein, sample analysis system 100 includes a target holder 110 that holds two targets 106 and 108 in place. In FIG. 1A, for example, target holder 110 includes recessed areas that prevent targets 106 and 108 from moving laterally once placed inside the areas. A target may be, for example, a glass slide, a coverslip, a plastic substrate, charged cytological slide, coated cytological slide. In some embodiments, sample holder 110 may hold two or more different types of targets. Sample analysis system 100 includes a plurality of gas nozzles 102 and 104. These gas nozzles are connected to one or more pressurized gas sources, such that, when the nozzles are activated, gas is expelled from the nozzles towards targets 106 and 108. The gas may be, for example, compressed air, nitrogen, carbon dioxide, nitrous oxide, helium, argon, etc.

Additionally, sample analysis system 100 includes a sample dispenser 120 (also referred to as the specimen input port or SIP). Sample dispenser 120 includes sample reservoir 122 (also referred to as an inlet port or well) and at least two fluid paths 124 and 126, which terminate in sample nozzles 134 and 136, respectively. As shown in FIG. 1A, sample reservoir 122 is fluidically coupled to both sample nozzles 134 and 136 via fluid paths 124 and 126, respectively.

Furthermore, sample analysis system 100 includes a sample dispenser holder 112. Sample dispenser holder 112 is arranged to hold sample dispenser 120 such that the sample nozzles 134 and 136 are positioned between gas nozzles 102 and 104 and targets 106 and 108, respectively. In particular, the sample nozzles 134 and 136 are positioned to be in a path of the gas expelled by gas nozzles 102 and 104, respectively. In some embodiments, sample dispenser 120 may be fixed to sample analysis system 100 by sample dispenser holder 112. In other embodiments, sample dispenser 120 may be removable from sample analysis system 100, and sample dispenser holder 112 may passively and/or actively align sample dispenser 120 with respect to gas nozzles 102/104 and/or targets 106/108 after sample dispenser 120 is inserted into sample analysis system 100. The sample dispenser 120 is typically a consumable component that is disposed after being used once (or a predetermined number of times).

In operation, a user may deliver a fluidic sample to sample reservoir 122 of sample dispenser 120. For example, a user may use a syringe to collect and expel the collected fluidic sample inside sample reservoir 122. In another example, sample analysis system 100 may automatically deliver the fluidic sample to sample reservoir 122 (e.g., after detecting the presence of a sample dispenser 120). In yet another example, a user may deliver the fluidic sample to another part of sample analysis system 100 such that it is routed to the sample reservoir 122.

After the fluidic sample is delivered to sample reservoir 122, for example by way of capillary action, the fluidic sample is transported to the sample nozzles 134 and 136. In some embodiments, sample dispenser 120 is configured such that the fluidic sample does not flow through fluid paths 124 and 126 unless the gas nozzles 102 and 104, respectively, are activated.

After the fluidic sample is delivered to sample reservoir 122, gas nozzles 102 and 104 may be activated by the user (and/or automatically by sample analysis system 100). The gas from the nozzles causes the fluidic sample to become aerosolized and deposited on surfaces of targets 106 and 108. In some embodiments, sample dispenser 120 can be configured such that a predetermined amount of the fluidic sample is expelled from each sample nozzle 134 and 136 when gas nozzles 102 and 104, respectively, are activated. Advantageously, this enables sample analysis system 100 to consistently deposit a predetermined amount of fluidic sample to each target. In some embodiments, sample dispenser 120 may be configured such that substantially the same amount of the fluidic sample is expelled from each sample nozzle 134/136 when gas nozzles 102/104 are activated. This enables sample analysis system 100 to consistently deposit the same, predetermined amount of fluidic sample to each target. In some embodiments, the amount of fluidic sample expelled from each sample nozzle may be, at least in part, based on the activation duration of the gas nozzles and/or gas pressure at the nozzles.

In some embodiments, after the fluidic sample is delivered to sample reservoir 122, sample analysis system 100 may deliver into sample reservoir 122 some fluid (or buffer solution) for expanding the sample volume. Such fluid may include, for example, a combination of at least one of: distilled water, saline solution, different concentrations of ethanol, buffer solution, isotonic solution, etc.

In FIG. 1A, sample analysis system 100 includes a target holder that holds two targets, sample dispenser 120 with two sample nozzles and two gas nozzles. In some embodiments, sample analysis system 100 may include additional target holder(s) and/or a target holder that holds more than two targets. In these embodiments, sample dispenser 120 may include additional sample nozzles (and a corresponding number of additional gas nozzles) such that the number of sample nozzles match the number of samples that can be held by system analysis system 100.

In some embodiments, each target may receive sample dispensed from two or more sample nozzles. In these embodiments, each target may have two or more patches of samples dispensed onto its surface.

Figure 1B:
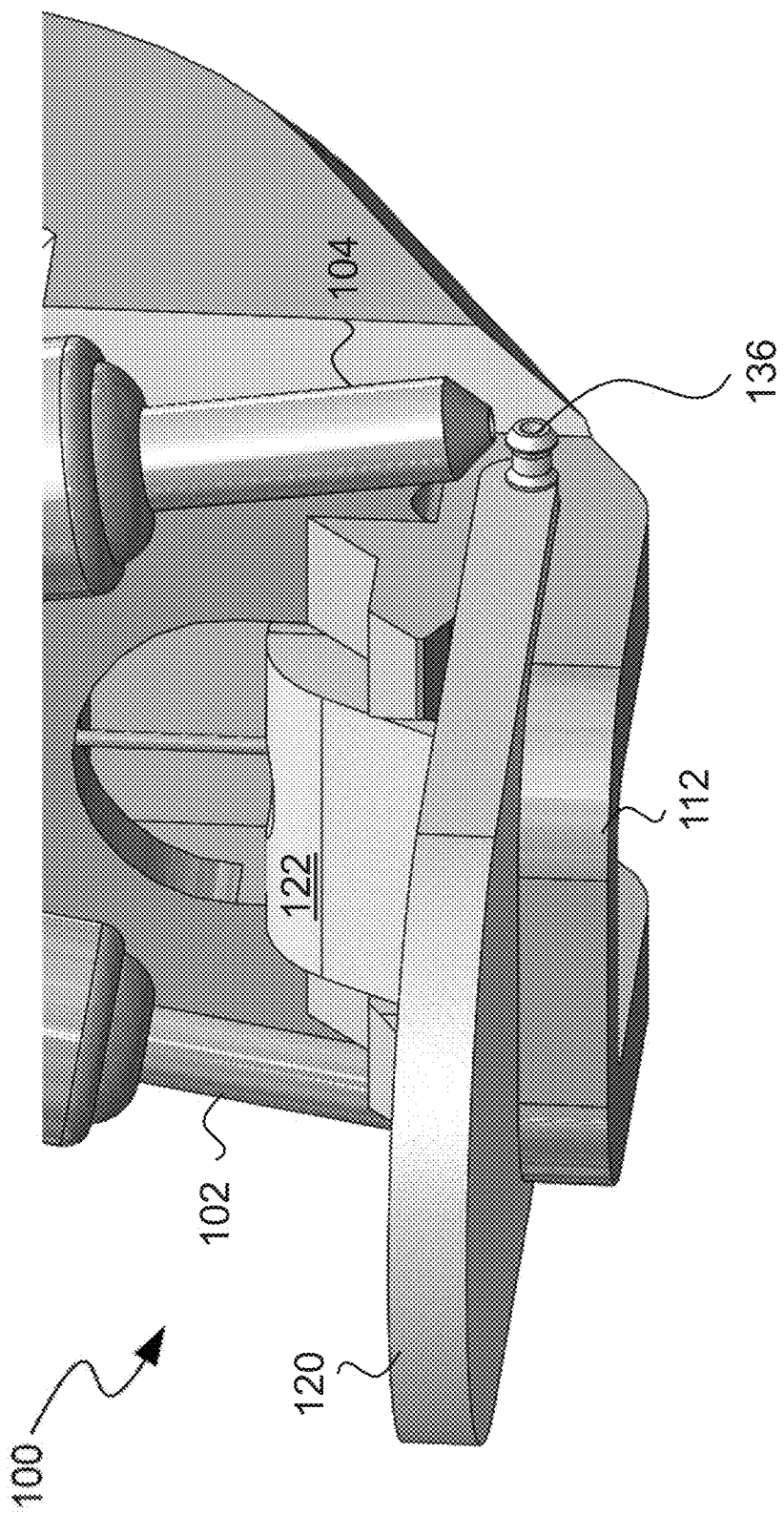
FIG. 1B illustrates another example of a sample analysis system.

FIG. 1B illustrates another example of a sample analysis system 100, in which the sample dispenser holder 112 is integrated into the sample analysis system and to ensure the correct alignment and efficacy of the air nozzles with regard to the sample nozzles (e.g., air nozzle 104 and sample nozzle 136, respectively).

Examples of a Consumable Specimen Input Port (SIP)

FIGS. 2-12 illustrates various embodiments and features of a specimen input port (SIP) or sample dispenser (e.g., sample dispenser 120 in FIGS. 1A and 1B). Although shown and described as different embodiments, the features described in any embodiment are not restricted to that specific embodiment, but may be combined with the sample dispenser described in another embodiment.

Figure 2:
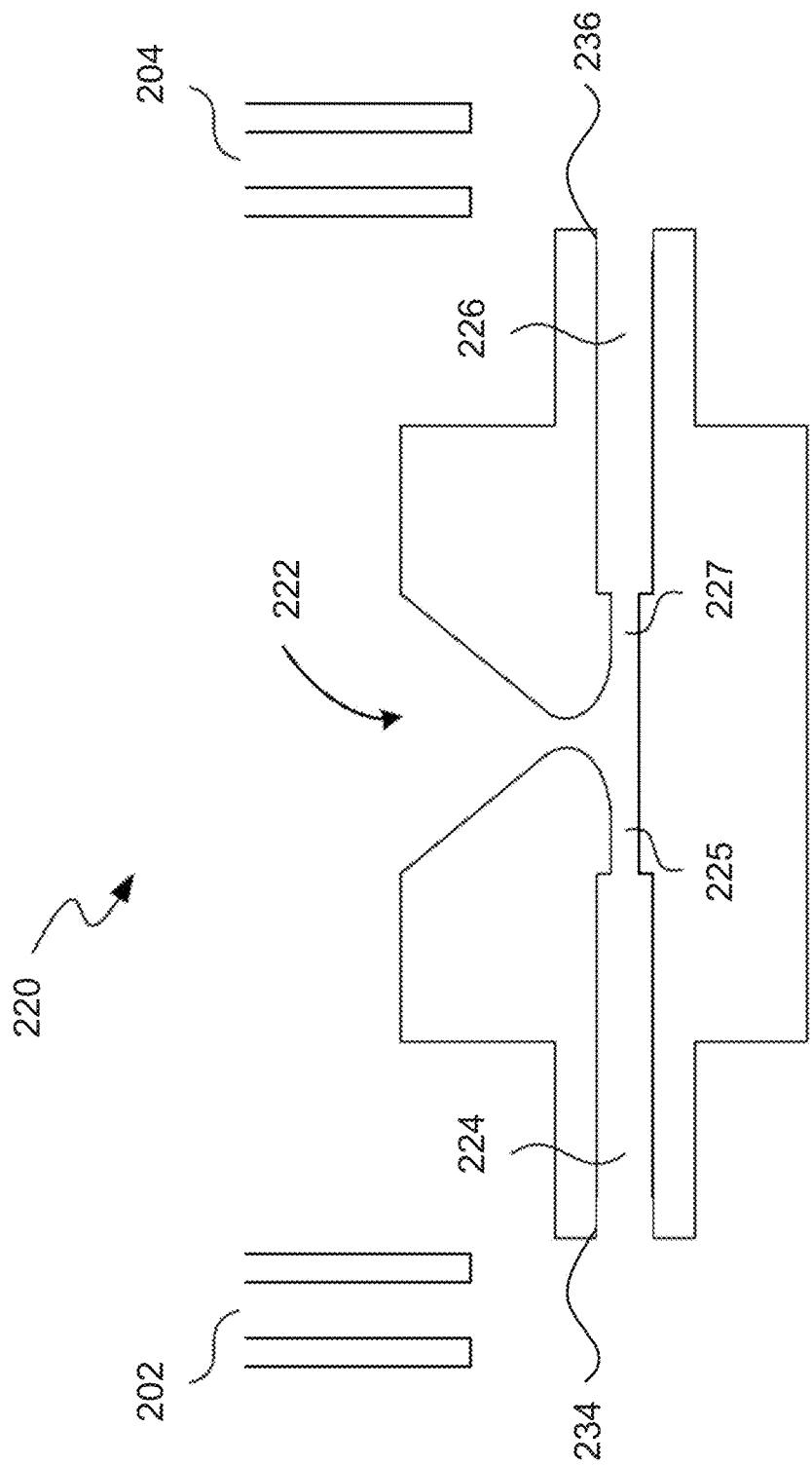
FIG. 2 illustrates an example of the sample dispenser of FIG. 1A.

FIG. 2 illustrates an example of sample dispenser 120 and gas nozzles 102 and 104 of FIG. 1A. As shown in FIG. 2, sample dispenser 220 includes a first tubular structure 224 (e.g., fluid path 124 in FIG. 1A) that terminates in a first sample nozzle 234, a second tubular structure 226 (e.g., fluid path 126 in FIG. 1A) that terminates in a second sample nozzle 236, and a sample reservoir 222 (e.g., inlet port 122 in FIGS. 1A and 1B). Sample dispenser 220 further includes a first restrictor (also a tubular structure) 225, that fluidically couples tubular structure 224 to sample reservoir 222. Correspondingly, sample dispenser 220 includes a second restrictor 227 (also a tubular structure) that fluidically couples tubular structure 226 to sample reservoir 222.

In some embodiments, a cross-sectional area of tubular structure 224 is greater than a cross-sectional area of restrictor 225, and a cross-sectional area of tubular structure 226 is greater than a cross-sectional area of restrictor 227. In some embodiments, tubular structures 224/226 and restrictors 226/227 may have at least one of the following cross-sectional shapes: circle, oval, rectangular, and polygon. In some embodiments, sample reservoir 222 may have a volume between 5 μL (microliters) to 150 μL. In some embodiments, sample reservoir 222 may have a volume less than 2 milliliters.

As shown in FIG. 2, tubular structure 224, tubular structure 226, restrictor 225, and restrictor 227 are shown to have the same cross-sectional shape and area throughout their lengths. In some embodiments, however, at least one of tubular structure 224, tubular structure 226, restrictor 225, and restrictor 227 may have a cross-section that varies over its length (e.g., as described in the example shown in FIG. 12). In these embodiments, an average cross-sectional area of tubular structure 224 would be greater than an average cross-sectional area of restrictor 225, and an average cross-sectional area of tubular structure 226 is greater than an average cross-sectional area of restrictor 227.

In some embodiments, restrictors 225 and 227 may each be about 0.1 mm to about 2 mm long, and for example, in increments of 0.1 mm. In some embodiments, the distance between the tubular structures 224 and 226 may about 1 mm to about 2 mm, and for example, in increments of 0.1 mm. In some embodiments, a cross-section of restrictors 225 and 227 may be a circle having a diameter of about 0.5 mm to about 1.5 mm, and for example, in increments of 0.1 mm. In some embodiments, a cross-section of restrictors 225 and 227 may be a circle with a diameter smaller than 0.8 mm. In some embodiments, tubular structures 224 and 226 may each be about 10 mm long. In some embodiments, cross-sections of tubular structures 224 and 226 may be a circle with a 0.8 mm diameter.

As shown in FIG. 2, the tubular structures 224 and 226 terminate in sample nozzles 234 and 236, respectively, that protrude from sample dispenser 220. The protrusion of the sample nozzles allows the gas nozzles to be in close proximity to the exterior openings of tubular structures 224 and 226. Furthermore, the protrusion allows a smooth airflow to be applied directly to the sample in the airstream, rather than the air being disturbed by other surfaces. Thus, the location and stability of the air nozzle relative to the tube outlets impacts the spray pattern produced, and, the nozzles may be positioned such that the air is able to flow directly past the end of the tube undisturbed. In some embodiments, the length of the protrusion may be about 1 mm. In some embodiments, the length of the sample nozzle may be between 0.1 mm and 1 mm, and for example, in increments of 0.1 mm. In some embodiments the length of the sample nozzle may be between 1 mm and 10 mm, and for example, in increments of 1 mm.

In some embodiments, inner surfaces of tubular structure 224, tubular structure 226, restrictor 225, and/or restrictor 227 may be coated with (and/or made of) hydrophobic material(s), hydrophilic material(s), and/or a material with known hydrophilic/hydrophobic properties. For example, the material can be Teflon or similar to limit the resistance of the fluid flowing through the inner tube.

As shown in FIG. 2, sample reservoir 222 may have a conical (or pyramidical) shape and connect to restrictors 225 and 227 at the reservoir's narrow, conical-end. In other embodiments, sample reservoir 222 may have a prismatic or a cylindrical shape. In these embodiments, sample reservoir 222 may connect to restrictors 225 and 227 via a hole on the prismatic or cylindrically shaped sample reservoir 222.

In operation, a user may deliver collected fluidic sample to sample reservoir 222. For example, a user may use a syringe to collect and expel the collected fluidic sample inside sample reservoir 222. After the fluidic sample is delivered to sample reservoir 222, capillary action occurs and transports the fluidic sample to edges of restrictors 225 and 227, but the fluidic sample does not flow into tubular structures 224 and 226.

The relatively small cross-sectional areas of restrictors 225 and 227 increase the amount of force required to transport fluid through them. Therefore, restrictors 225 and 227 may counteract at least some of the force acting on the fluidic sample by the gravity. Without restrictors 225 and 227, the gravity may cause the fluidic sample to pass through the tubular structures 224 and 226 and become expelled from sample dispenser 220 as the fluidic sample is being delivered to sample reservoir 222. With restrictors 225 and 227, however, the fluidic sample is transported to edges of restrictors 225 and 227 but does not flow into tubular structures 224 and 225 and out of sample nozzles 234 and 236, respectively (unless gas nozzles 202 and 204 are respectively activated).

In some embodiments, before, during, or after the fluidic sample is delivered to sample reservoir 222 and the fluidic sample is transported to edges of restrictors 225 and 227 by way of capillary action, gas nozzles 202 and 204 may be activated by the user (and/or automatically by the sample analysis system). The gas from the nozzles causes the fluidic sample to first enter the tubular structures 224 and 226 then exit, via sample nozzles 234 and 236, into the gas stream to become aerosolized towards the targets until the fluidic sample inside tubular structures 224 and 226 is depleted. In particular, the gas from the nozzles may apply negative pressure at the sample nozzles 234 and 236 to cause the fluidic sample to become expelled from tubular structures 224 and 226.

Subsequently, the expelled fluidic sample is aerosolized by the gas nozzles onto surfaces of the targets (e.g., slides). In some embodiments, the gas nozzles may be activated for about 0.1 sec to 0.5 sec, and for example, in increments of 0.1 sec, with positive pressure up to 200 kPa pressure per nozzle. In some embodiments, the gas nozzles may be activated with a pressure ranging from 10 kPa to 190 kPa. In some embodiments, the gas nozzles may have 1 mm opening diameter. In some embodiments, the gas nozzles may have an opening diameter between 0.2 mm and 2.0 mm, and for example, in increments of 0.1 mm.

Advantageously, the amount of fluidic sample deposited on the surfaces of the targets is based on the duration and pressure of the gas applied to the sample nozzles 234 and 236.

Furthermore, the relative volumes of tubular structures 224 and 226 and/or restrictors 225 and 227 may affect the relative rates of sample deposition. Accordingly, if a system requires deposition of substantially the same amount of sample, restrictors 225/227 and tubular structures 224/226 may be designed to be symmetric about the inlet port 222. Accordingly, in some embodiments, the volume of the deposited sample on a target may depend on gas pressure, duration of nozzle activation, and dimensions of the tubular structures.

In the example shown in FIG. 2, tubular structures 224 and 226, and restrictors 225 and 227, are shown to be straight. In some embodiments, at least a portion of tubular structure 224, tubular structure 226, restrictor 225, and/or restrictor 227 may be curved towards and/or away from the sample nozzles 234 and 236, respectively.

Figure 3:
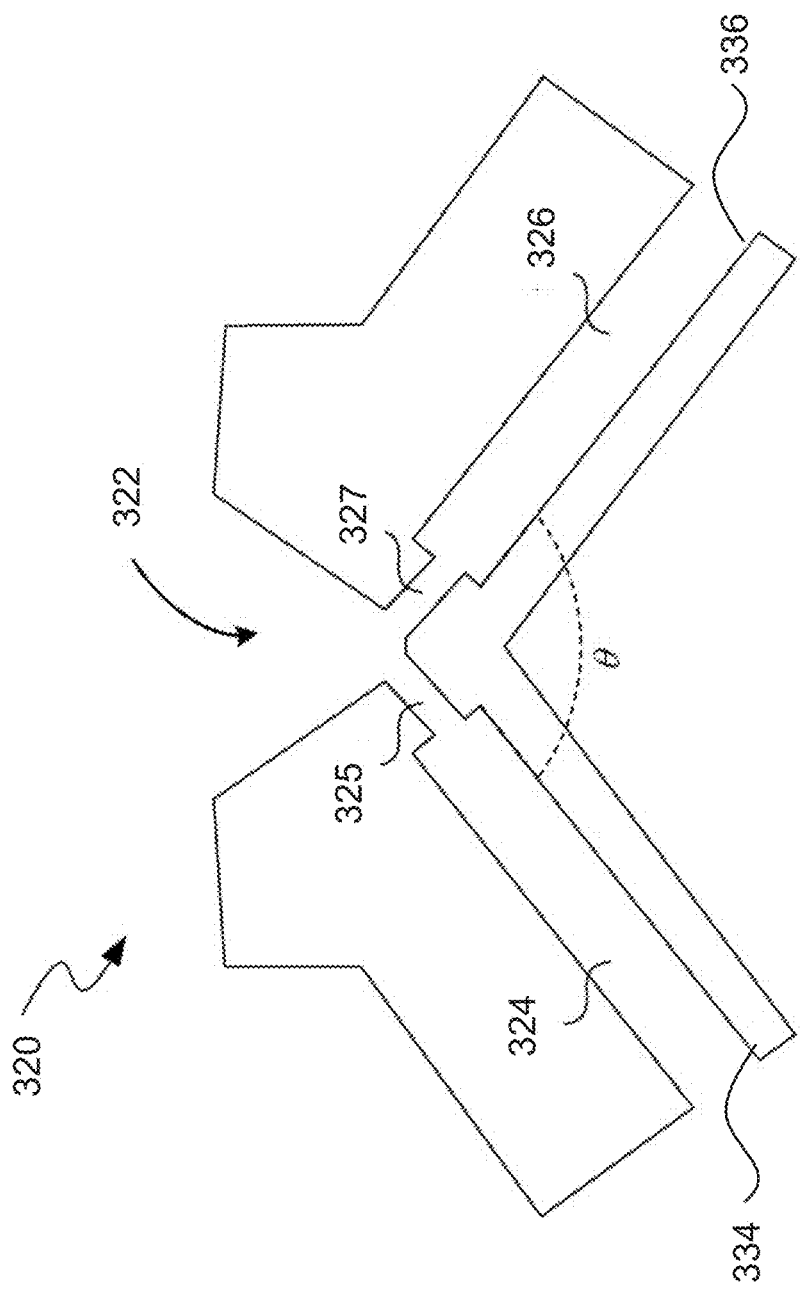
FIG. 3 illustrates another example of the sample dispenser of FIG. 1A.

FIG. 3 illustrates another example of a sample dispenser. Sample dispenser 320 is similar to sample dispenser 220 of FIG. 2 except that the first and second tubular structures 324 and 326 in FIG. 3 are at an obtuse or acute angle (theta) with respect to each other. In these embodiments, spray patterns from the nozzles may be preferable for some applications. In some embodiments, the angle theta in FIG. 3 may range between 180° and 30°. In some embodiments, the angle theta in FIG. 3 may be zero degrees such that both first and second tubular structures 324 and 326 are oriented towards substantially the same direction (i.e., towards the targets) and/or parallel. Additionally, or alternatively, first and second tubular structures 324 and 326 may be angled with respect to a plane perpendicular to the target.

Figure 4:
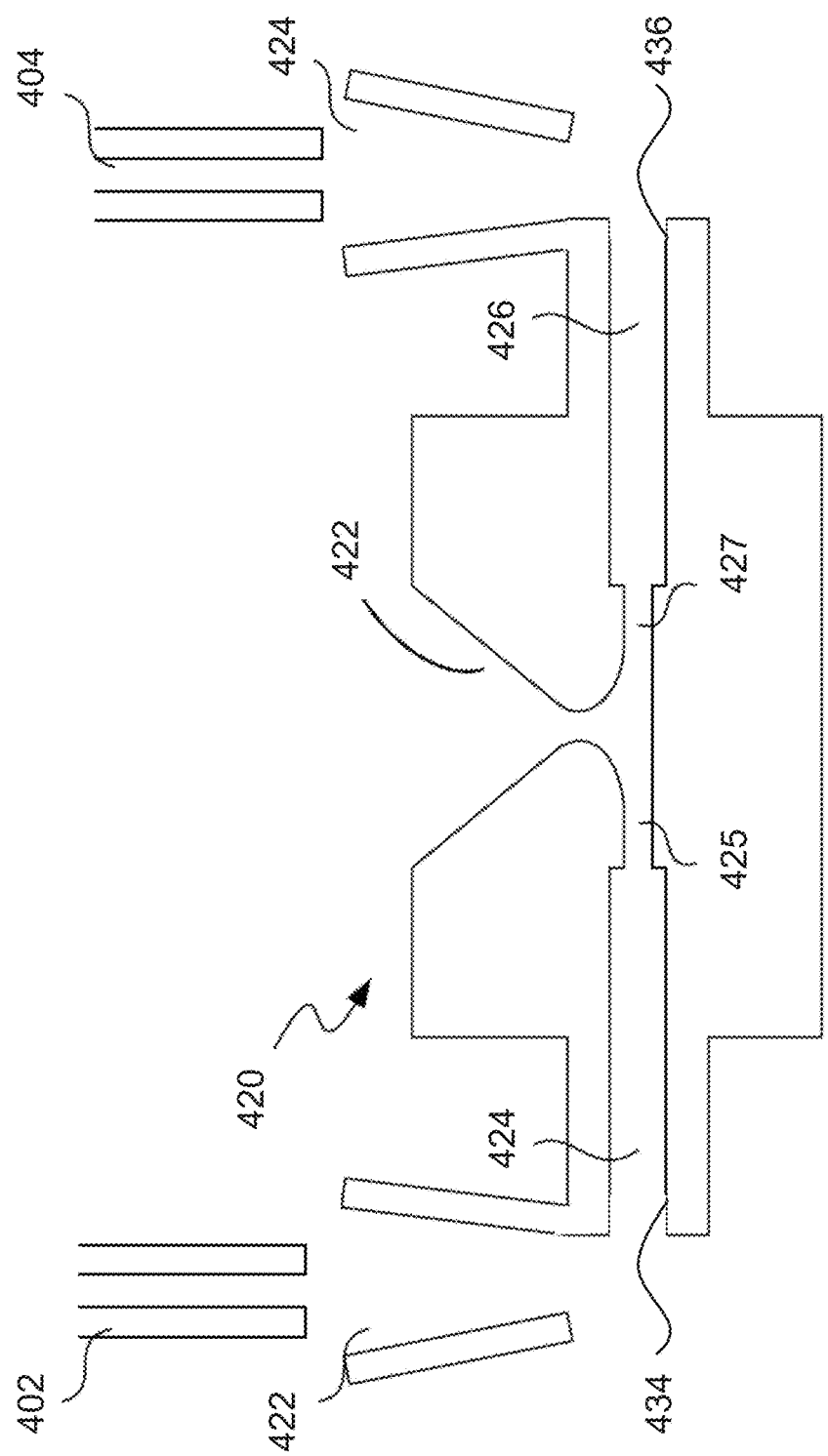
FIG. 4 illustrates yet another example of the sample dispenser of FIG. 1A.

FIG. 4 illustrates yet another example of sample dispenser. Sample dispenser 420 is similar to sample dispenser 120 of FIG. 1A except that sample dispenser 420 includes air nozzle interfaces 422 and 424 to interface with air nozzles 402 and 404 of a sample analysis system. Air nozzle interfaces 422 and 424 are positionally and angularly fixed with respect to tubular structures 424 and 426, respectively. For example, air nozzle interfaces 422 and 424 and tubular structures 424 and 426 may be parts of the same rigid structure (not shown in FIG. 4).

Advantageously, air nozzle interfaces 422 and 424 that are positionally and angularly fixed with respect to tubular structures 424 and 426 may reduce deposition variations arising from misalignment between air nozzles 402 and 404 and tubular structures 424 and 426, respectively. For example, air nozzle interfaces 422 and 424 guide the gas expelled by air nozzles 402 and 404 to intersect with the sample nozzles 434 and 436 precisely at the predetermined position and angle. Misalignment between air nozzles 402 and 404 and tubular structures 424 and 426 may arise from, for example, imprecise manufacturing of sample dispenser holder (e.g., sample dispenser holder 112 in FIGS. 1A and 1B) and/or the sample dispenser (e.g., 120, 220, 320 or 420). In some instances, the misalignment can also arise from incorrect location and/or positioning of the nozzles relative to the sample dispenser holder.

In some embodiments, as shown in FIG. 4, air nozzle interfaces 422 and/or 424 may have wider openings (e.g., by having conical- or pyramid-like openings) at an end facing the air nozzles than the samples nozzles 434 and 436. Advantageously, the wider openings may allow the air nozzle interfaces 422/424 to compensate for greater misalignments between air nozzles 402/404 and sample dispenser 420.

FIGS. 5A and 5B illustrate yet another example of a sample dispenser. The sample dispenser 520 shown in FIGS. 5A and 5B is similar to sample dispenser 120 in FIG. 1B. The inlet port 522 is fluidically coupled to the sample nozzles 534 and 536 via the fluid paths 524 and 526, respectively. As shown in FIG. 5B, the sample dispenser 520 further includes an indentation on an opposite end of the sample dispenser from the inlet port and sample nozzles, which enables the user to securely grip the sample dispenser in order to correctly place it in the sample analysis system (not shown in FIGS. 5A and 5B).

In some embodiments, the indentation includes a cover (not shown in FIGS. 5A and 5B) to protect the finger of the user or technician who typically grips the SIP with one hand and uses, for example, the needle from a fine-needle aspiration process to deposit the sample material into the inlet port 522.

In some embodiments, the sample nozzles 534 and 536 of the sample dispenser 520 are positioned such that the aerosolized sample exits in opposite directions to then be deposited on the target (e.g., a slide, not shown in FIGS. 5A and 5B). The inlet port 522 may be configured to be a narrow opening, as shown in FIGS. 5A and 5B, and the sample nozzles 534 and 536 may be configured to deposit a sample in a circular shape on the target in a monolayer. That is, the sample nozzles may be configured to ensure that overlapping sample cells are minimized, and preferably eliminated, when the sample if deposited on the target.

In some embodiments, the inlet port 522 may include a notch (not explicitly shown in FIGS. 5A and 5B) that enables a buffer solution to be passively added to the specimen material. Adding the buffer solution advantageously enables the sample material to be uniformly distributed on the target. In an example, the buffer solution is phosphate-buffered saline (PBS), which is a water-based salt solution containing disodium hydrogen phosphate, sodium chloride and, in some formulations, potassium chloride and potassium dihydrogen phosphate.

In some embodiments, the buffer solution can be selected as one or more of the following: TAPS ([tris(hydroxymethyl)methylamino]propanesulfonic acid), Bicine (2-(bis(2-hydroxyethyl)amino)acetic acid), Tris (tris(hydroxymethyl)aminomethane) or (2-amino-2-(hydroxymethyl)propane-1, 3-diol), Tricine (N-[tris(hydroxymethyl)methyl]glycine), TAPSO (3-[N-tris(hydroxymethyl)methylamino]-2-hydroxypropanesulfonic acid), HEPES (4-(2-hydroxyethyl)-1-piperazineethanesulfonic acid), TES (2-[[1,3-dihydroxy-2-(hydroxymethyl)propan-2-yl]amino]ethanesulfonic acid), MOPS (3-(N-morpholino)propanesulfonic acid), PIPES (piperazine-N, N'-bis(2-ethanesulfonic acid)), Cacodylate (dimethylarsenic acid), and MES (2-(N-morpholino)ethanesulfonic acid).

In some embodiments, the buffer solution and the specimen material may be actively mixed when being delivered to the inlet port 522. In an example, a micro-scale fan may be installed adjacent to the inlet port to actively mix the specimen material and the buffer solution. In another example, acoustic or ultrasonic mixing may be used to perform the active mixing. In yet another example, flow pulsation can be used to perform the active mixing. In yet another example, the buffer solution may be added to the inlet port with increased pressure to perform the mixing operation.

FIGS. 6A and 6B show yet another embodiment of the sample dispenser. The sample dispenser 620 is similar to the specimen input port (SIP) shown in FIG. 5, but the sample nozzles 634 and 636 are configured to be parallel to each other. Both the SIPs shown in FIGS. 5A/5B and 6A/6B are configured to expel the sample material in a forward direction (with respect to the placement of the SIP in the sample analysis system) when the gas nozzles are activated. However, this configuration of the sample nozzles, as shown in FIGS. 6A and 6B, results in an oval-shaped deposition footprint on the target (which will be further described in the context of FIG. 8), as compared to round deposition footprint on the target that is produced by the SIP shown in FIG. 5.

In the embodiment shown in FIGS. 6A and 6B, the inlet port 622 is fluidically coupled to the sample nozzles 634 and 636 by fluid paths that are embedded within the SIP 620. In an example, the embedded fluid paths may be straight. In another example, the embedded fluid paths may be curved to minimize the fluid paths and the distance traversed by the sample material between the inlet port 622 and the sample nozzles 634 and 636.

FIGS. 7A and 7B show yet another embodiment of the SIP. The specimen input port 720 is similar to the sample dispenser 620 shown in FIG. 6, except that the sample nozzles 734 and 736 are configured to expel the sample material in a backward direction (with respect to the placement of the SIP in the sample analysis system) when the gas nozzles are activated. Similar to the embodiment shown in FIGS. 6A and 6B, the parallel sample nozzles result in an oval-shaped deposition footprint on the target upon the activation of the gas nozzles.

Embodiments of the disclosed technology concurrently use multiple sample nozzles (e.g., sample nozzles 534/536, 634/636 and 734/736 in FIGS. 5-7), which advantageously enable consistent deposits to be made on multiple targets. In an example, using the SIP shown in FIGS. 5A and 5B (which includes sample nozzles facing opposite directions that deposit a circular footprint on the target) results in 50% to 70% of the cells being deposited on the slide, whereas using the configuration in FIG. 6A/6B or 7A/7B, which include parallel nozzles that are configured to deposit an oval-shaped footprint on the target, increases the amount of cells deposited on the target to increase to 80% to 95%, thereby reducing cell loss.

In some embodiments, the sample dispenser may be configured to deposit unequal amounts of the sample material on the first target as compared to the second target. In an example, this may be achieved by using unequal gas pressures at the two gas nozzles. In another example, this may be achieved by having the first gas nozzle or the first sample nozzle be of a different size or shape compared to the second gas nozzle or second sample nozzle, respectively. In yet another example, a different material coating may be used on the first fluid path as compared to the second fluid path. In yet another example, the diameter or length of the first fluid path may be different from that of the second fluid path. In yet another example, a blocker material may be used to enable a larger amount of sample material is deposited on one target as compared to the other target.

In some embodiments, the sample material may be added to the inlet port (e.g., 522, 622 or 722 in FIGS. 5-7, respectively) using the hollow needle that is used for fine-needle aspiration (FNA), and which contains the cells that have just been collected from the patient, and are ready to distributed on targets (e.g., slides) for examination and/or investigation. In other embodiments, the sample material may be pre-mixed with a buffer solution and the mixed fluidic sample may be added to the inlet port for distribution on the targets.

In some embodiments, the sample dispensers (or portions of the sample dispensers that are in contact with the sample materials) may be molded using materials with low surface energy. If a material has high surface energy, a liquid will spread over the surface of the material, whereas using a material with a low surface energy ensures that the liquid will bead up. The latter advantageously ensures that more of the sample material (or when appropriate, a mixture of the sample material and a buffer solution) will be expelled through the sample nozzles instead of remaining in the fluid paths or the inlet port. In an example, the material used to make be selected from the table shown below (which also provides the surface energy in milli-Newtons per meter (mN/m)).

TABLE 1

Materials (and surface energy) for SIP molding

| Material | Surface energy (mN/m) |
|---|---|
| Acrylic (poly(methyl methacrylate), PMMA) | 38 |
| Polystyrene (PS) | 34 |
| Styrene acrylonitrile (SAN) | 40 |
| Polycarbonate (PC) | 46 |
| Cyclic olefin copolymer (COC) | 30 |

Figure 5:
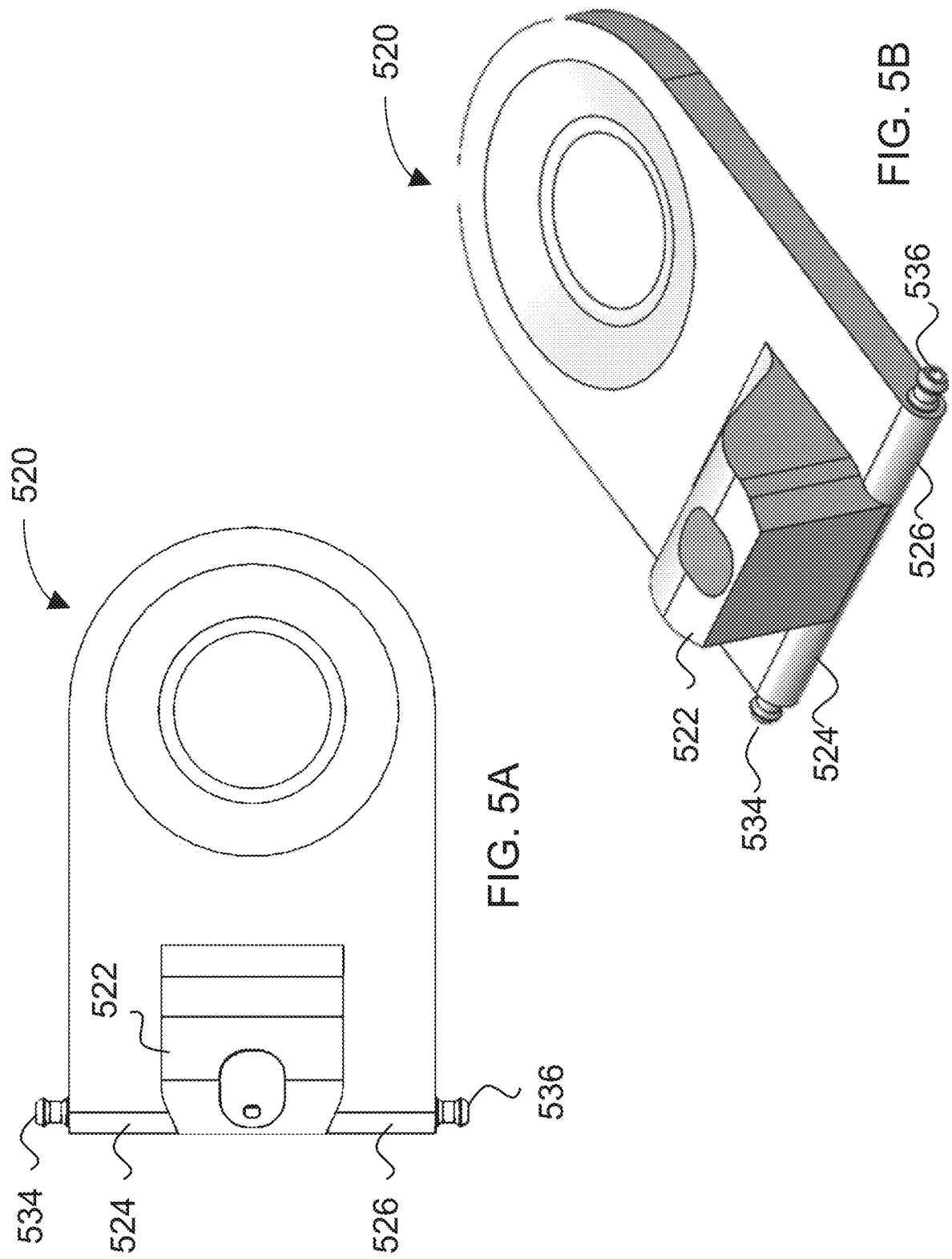
FIGS. 5A and 5B illustrate an example of a sample dispenser.
Figure 6:
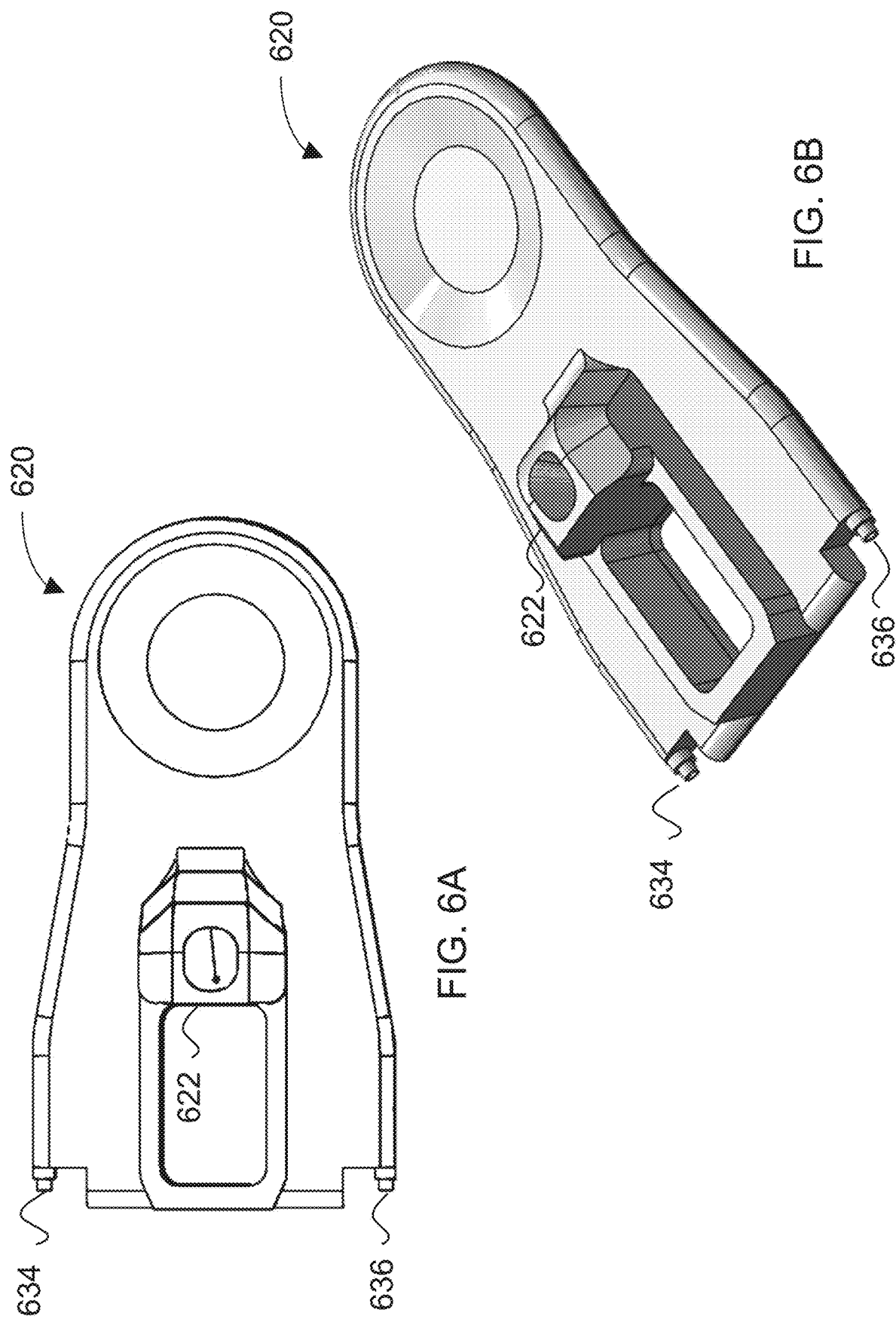
FIGS. 6A and 6B illustrate another example of a sample dispenser.
Figure 7:
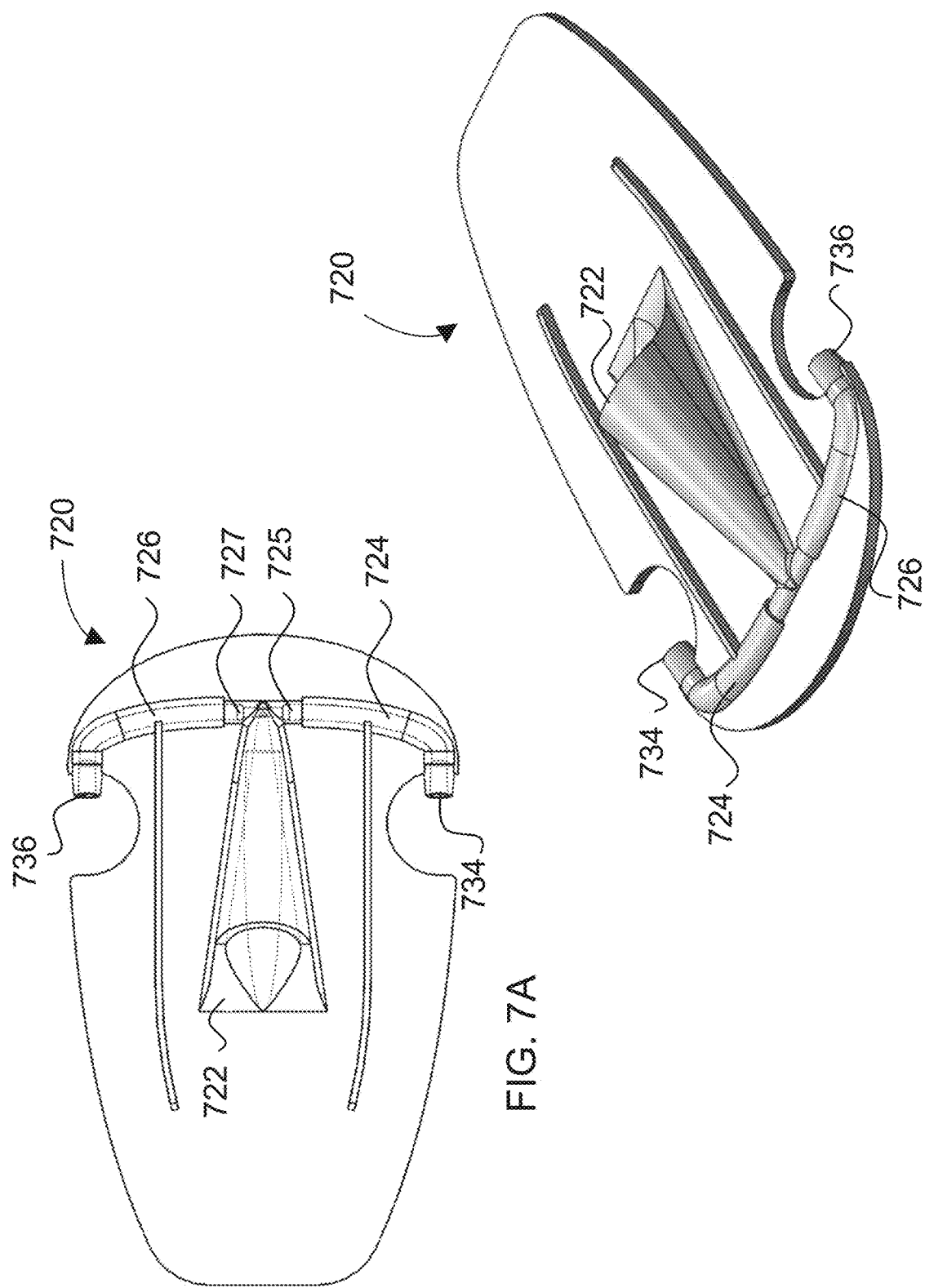
FIGS. 7A and 7B illustrate yet another example of a sample dispenser.

In some embodiments, the SIP shown in FIGS. 5-7 can further include the air nozzles. That is, the consumable SIP can include both the sample and air nozzles, which can be optimally aligned during manufacture to ensure that the gas expelled from the air nozzle (which can be connected to a pressure source that is part of the sample analysis system) results in the expulsion of all the sample material from the fluid paths through the sample nozzles.

Figure 8:
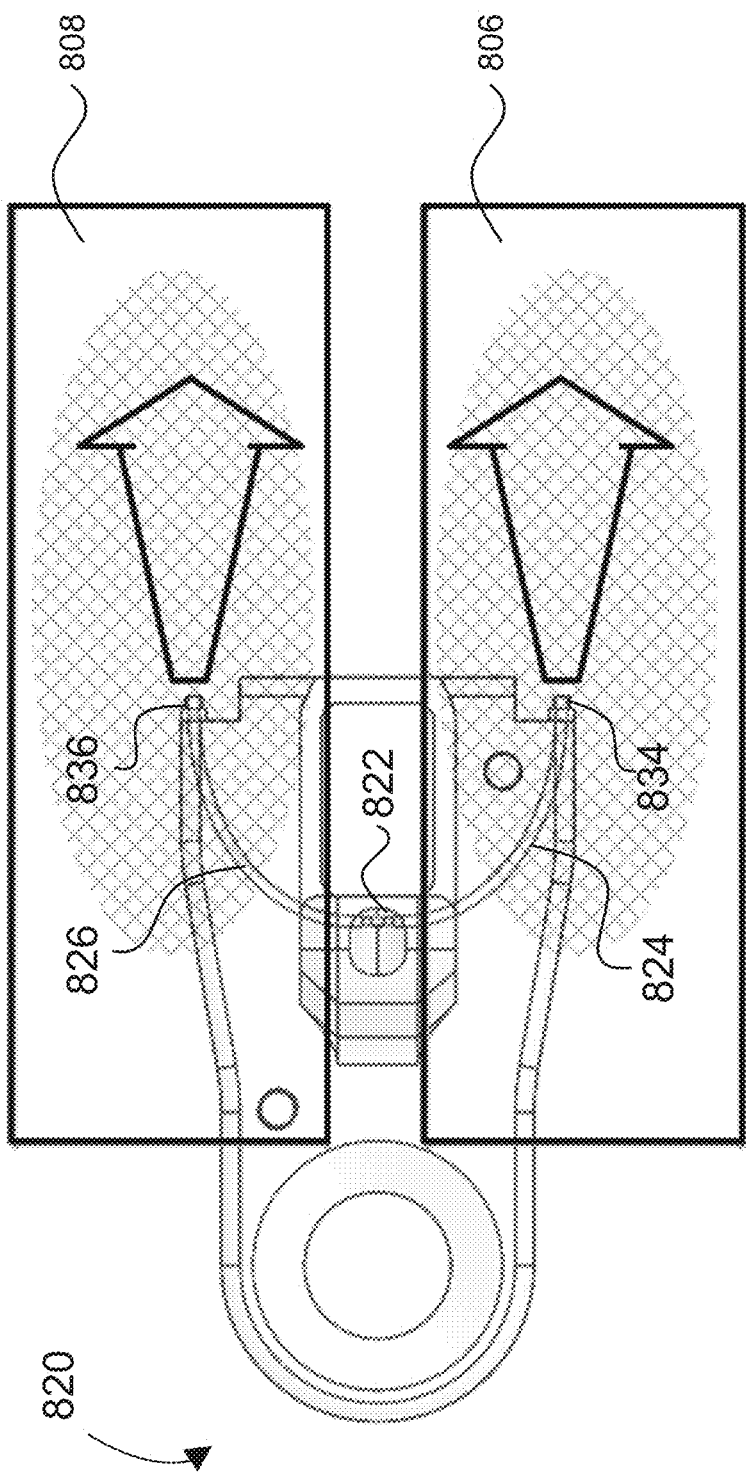
FIG. 8 illustrates an example of spraying a sample using the sample dispenser shown in FIGS. 6A and 6B.
Figure 9:
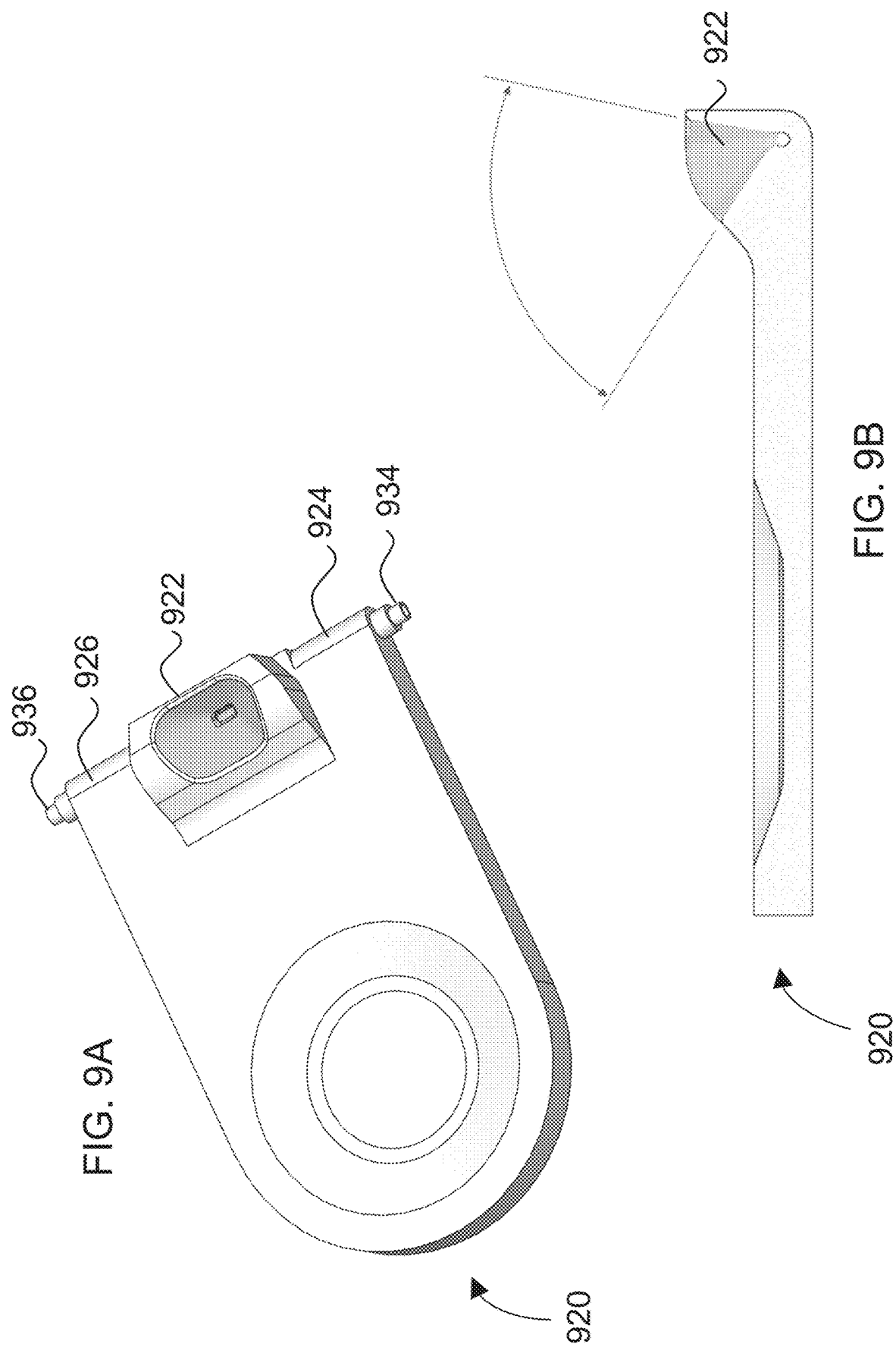
FIG. 9A illustrates an example of an inlet port on a sample dispenser.
FIG. 9B illustrates the geometry of the inlet port of FIG. 9A.
Figure 10:
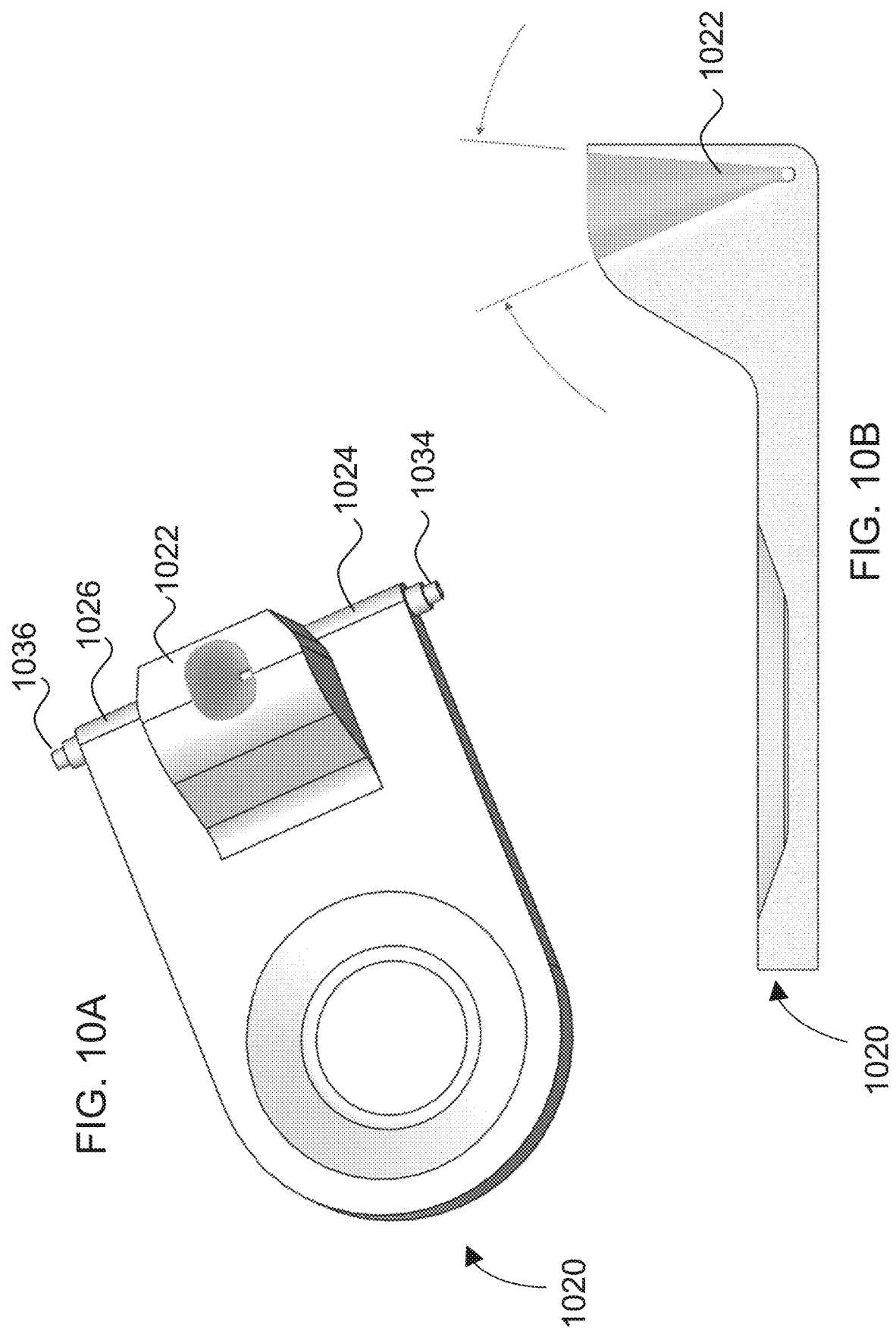
FIG. 10A illustrate another example of an inlet port on a sample disperser.
FIG. 10B illustrates the geometry of the inlet port of FIG. 10A.

FIG. 8 illustrates an example of spraying a sample using the sample dispenser shown in FIGS. 6A and 6B. As shown in FIG. 8, the sampler dispenser 820 includes the inlet port 822 is fluidically coupled to sample nozzles 834 and 836 via curved fluid paths 824 and 826, respectively, that are embedded within the structure of the sample dispenser. As described earlier, the parallel configuration of the sample nozzles results in an oval-shaped deposition footprint on the target (e.g., the slides 806 and 808 in FIG. 8). This configuration achieves a lower level of cell loss by depositing up to 70-80% of the cells on the target.

FIG. 9A illustrates an example of an inlet port on a sample dispenser, and FIG. 9B illustrates the geometry of the inlet port of FIG. 9A. FIG. 10A illustrates another example of an inlet port on a sample disperser, and FIG. 10B illustrates the geometry of the inlet port of FIG. 10A. As shown in therein, inlet port 922 in FIG. 9B is configured to be shallow and wide (with a large angle between the walls of the inlet port), whereas inlet port 1022 in FIG. 10B is configured to be deep and narrow (with a small angle between the walls of the inlet port). The geometry of the inlet port may be configured to maximize the drawing of the specimen (or sample material) into the fluid paths and subsequently to be expelled from the sample nozzles when the gas nozzles of the sample analysis system and activated.

In some embodiments, the inlet port can be configured to hold 5 µL to 150 µL. In an example, 2-10 µL of a sample and 20 µL of a buffer solution can be deposited into the inlet port. In some embodiments, the inlet port can include a "max-fill line" that prevents any overflow as long as the volume of the sample (or volume of sample and buffer solution) does not rise above this level. In some embodiments, the inlet port can include a needle guide that simplifies the use of the FNA needle for deposition of the sample into the sample dispenser.

Figure 11:
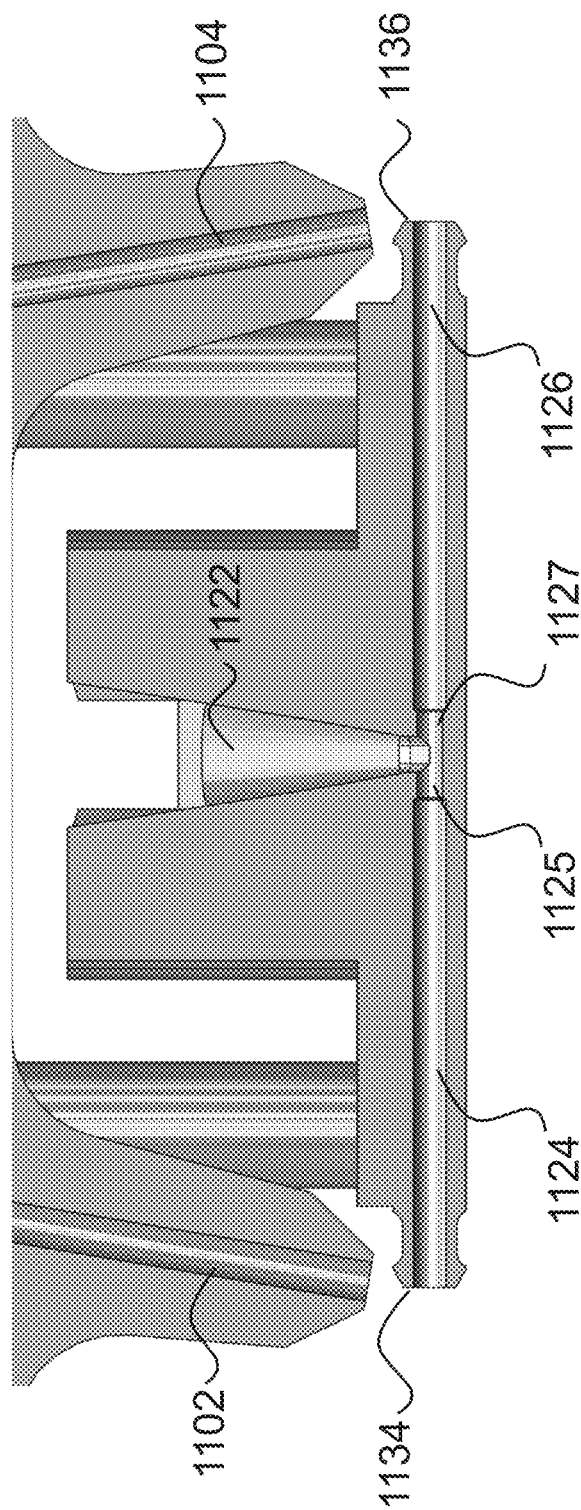
FIG. 11 illustrates an example of the tubular structure connecting the inlet port and the sample nozzle of a sample dispenser.

FIG. 11 illustrates an example of the cross-section of the tubular structure (or fluid path) that connects the inlet port and the sample nozzles of a sample dispenser. As described above in the context of FIG. 2, the restrictors 1125 and 1127 are of a smaller cross-section than the fluid paths 1124 and 1126, which allows the sample material that is placed into the inlet port 1122 to flow to the edge of the restrictors via capillary action, but not enter the fluid paths until the gas nozzles 1102 and 1004 have been activated.

The fluid paths 1124 and 1126, as shown in FIG. 11, are uniformly cylindrical from their start at the restrictors (1125 and 1127) to their respective sample nozzles 1134 and 1136. That is, the cross-sectional area of the fluid paths does not vary over their length.

Figure 12:
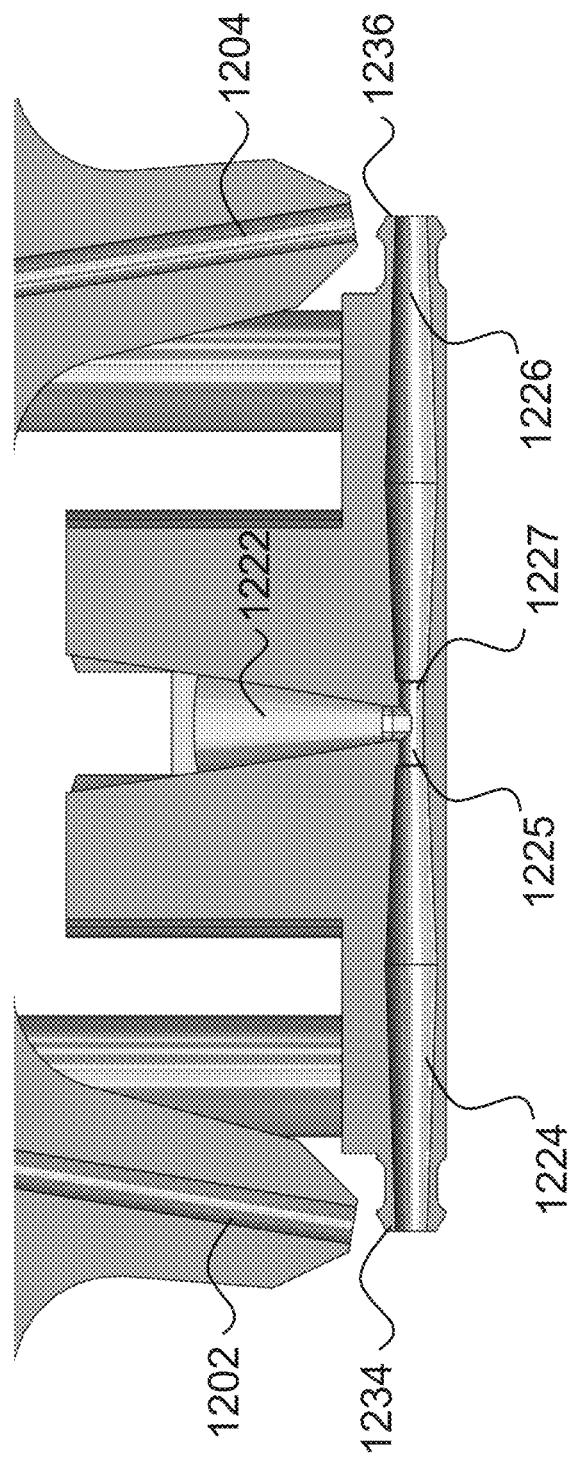
FIG. 12 illustrates another example of the tubular structure connecting the inlet port and the sample nozzle of a sample dispenser.

FIG. 12 illustrates another example of the cross-section of the tubular structure (or fluid path) that connects the inlet port and the sample nozzles of a sample dispenser. As shown in FIG. 12, the fluid paths 1224 and 1226 are not uniformly cylindrical, but include an initial flare followed by a taper before the samples nozzles 1234 and 1236 are reached. Thus, the cross-sectional area of the fluid path varies along its length, but the average cross-sectional area of the fluid paths 1224 and 1226 are greater than the cross-sectional area of the restrictors 1225 and 1227 to ensure that the fluidic sample only enters and is expelled from the fluid paths when the gas nozzles are activated and create a negative pressure at the sample nozzles. The varying cross-sectional area of the fluid path shown in FIG. 12 advantageously enables the tooling of the device with reduced complexity.

FIGS. 2-12 describe various embodiments of a SIP or sample dispenser, which is a consumable component of a sample analysis system, and is configured to be discarded after every use (or a predetermined number of uses). The features of the SIP described herein advantageously ensure that a monolayer (with minimally overlapping cells) of the sample material is uniformly and consistently distributed over multiple targets. These features include, but are not limited to, the geometry (e.g., size and depth) of the inlet port, the design of the fluid paths, the shape of the sample nozzle tip and the overall shape of the SIP.

Examples of a Consumable Hood

Another consumable component of a sample analysis system is a hood, illustrated in FIGS. 13-14, which provides a seal with the target (e.g., slides), prevents unintended dispersion and cross-contamination of the aerosolized sample, thereby improving the reliability and efficacy of the sample analysis.

Figure 13A:
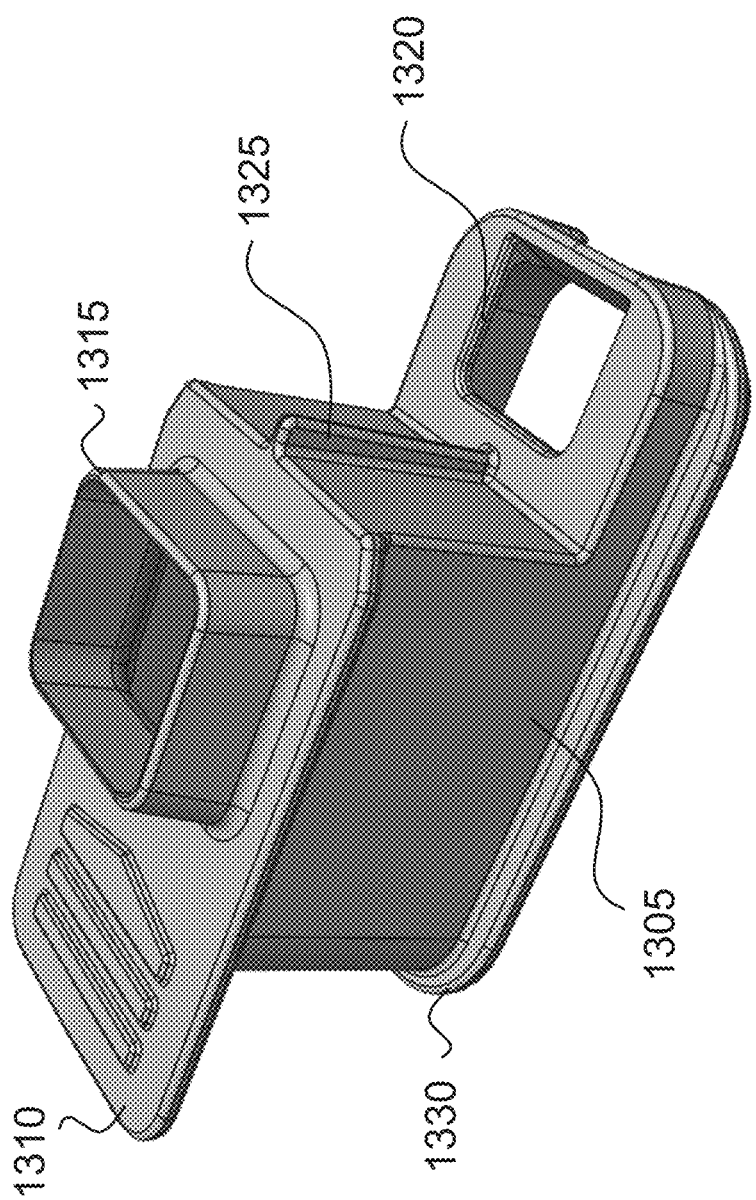
FIGS. 13A and 13B illustrates an example of a hood that improves the efficacy of a sample analysis system.
Figure 13B:
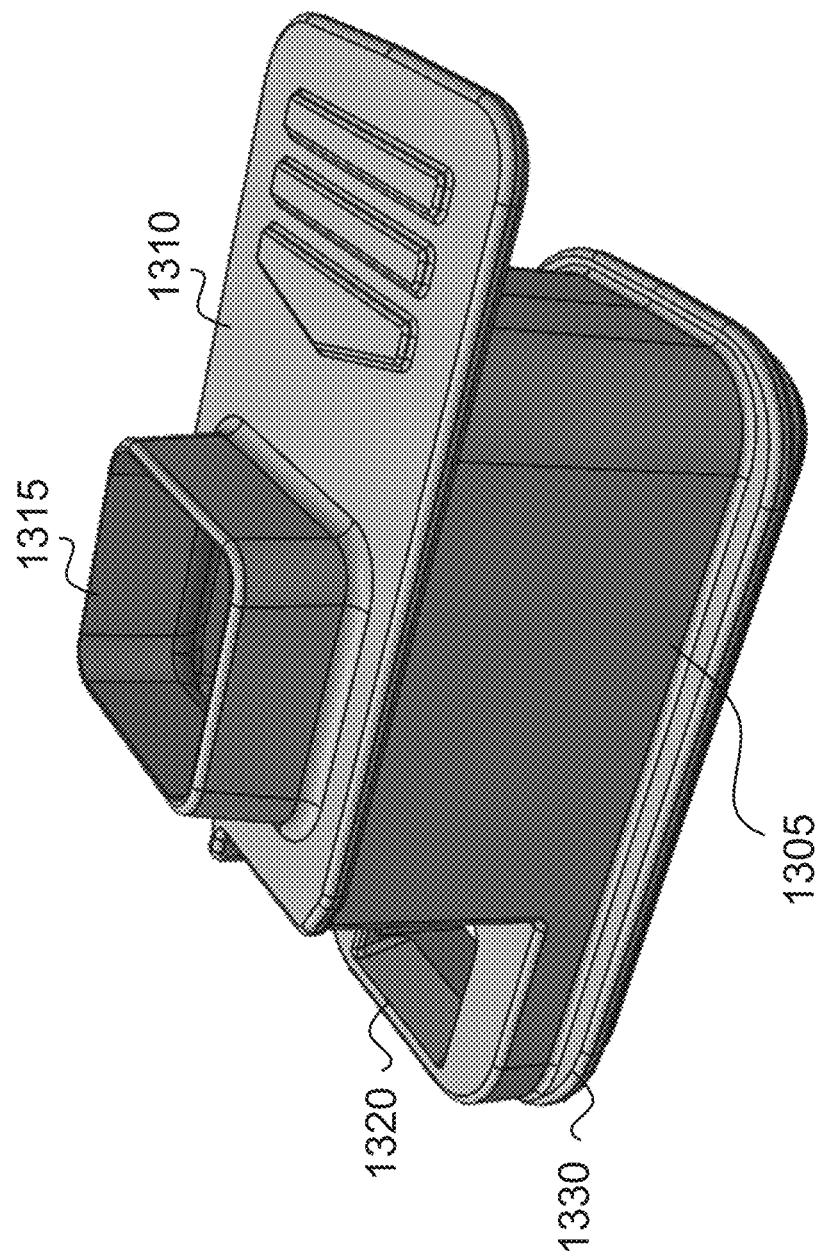

FIGS. 13A and 13B illustrates an example of a hood that improves the efficacy of a sample analysis system. As shown therein, the hood comprises a body 1305 with an upper portion, a middle portion and a lower portion. The upper portion includes a holder 1310 and an aerosol opening 1315, and the middle portion includes the stain opening 1320.

In some embodiments, the sample nozzle of the SIP can be positioned above the aerosol opening 1315 so that when the gas nozzle of the sample analysis system is activated, the aerosolized sample is deposited on the target with the hood ensuring that the sample is contained and preventing unintended dispersion or cross-contamination of the work space. In some embodiments, one or more stains used in the sample analysis can be added to the sample deposited on the target through the staining opening 1320.

In some embodiments, and as shown in FIGS. 13A and 13B, the aerosol opening 1315 and the stain opening 1320 are rectangular in shape. In other embodiments, one or both of the aerosol and stain openings may be circular, oval or polygon-shaped.

The body 1305 of the hood includes a first notch 1325 that enables the hood to be properly affixed to the sample analysis system. The lower portion of the hood includes a seal 1330, which affixes to the target and prevents any leakage of the aerosolized sample material that is distributed on the target. The hood further includes a second notch (not shown in FIGS. 13A and 13B) below the stain opening 1320, which (along with notch 1325) assists in the hood being properly placed in the sample analysis system. The notches enable the hood (and the target that is sealed by the bottom portion of the hood 1305) to properly positioned during the spraying and staining processes of the sample analysis operation.

FIGS. 14A and 14B illustrate an example of a sealing mechanism of the hood of FIGS. 13A and 13B. As discussed above, the seal 1430 of the hood 1405 prevents the deposited sample from leaking. As shown in FIGS. 14A and 14B, the seal 1430 includes a clamp 1432 that can be depressed when the hood makes contact with the target (e.g., microscope slides) to ensure that the seal is reliable and more effective than a simple rubber gasket.

In some embodiments, the hood may be manufactured from any one of the following materials (or their combinations): acrylic (poly(methyl methacrylate)), cyclic olefin copolymer, polystyrene, styrene acrylonitrile, polycarbonate, or polypropylene.

FIG. 15A illustrates an example of the relative positions of a sample dispenser and a hood in relation to a portion of a sample analysis system. As described above, the SIP 1520 is positioned such that the sample nozzle is directly above the aerosol opening of the hood, thereby enabling the aerosolized sample to be deposited on the target when the gas nozzles of the sample analysis system are activated. As shown in FIG. 15A, the stain opening is interlocked with a portion (or tab) of the sample analysis system using the notch below the stain opening.

FIG. 15B shows a detailed version of the example interlocking of the hood and the tab of the sample analysis system, wherein the tab includes two indentations (1541 and 1542) through which one or more needles that contain the stain or dye can be inserted to enable deposition of the stain or dye onto the aerosolized sample that has been sprayed on the target.

In some embodiments, the following technical solutions, based on the descriptions provided herein, may be implemented:

A1. A sample dispenser for dispensing substantially a same volume of liquid-based sample material to a plurality of targets, the dispenser comprising: a first tubular structure having a first inner volume and a first inner perimeter, wherein: (i) a first opening of the first tubular structure is disposed between a first gas nozzle and a first target, wherein the first gas nozzle is configured to expel gas towards the first target; and (ii) the first perimeter is selected such that capillary action can be induced to fill the first tubular structure with the liquid-based sample material via a second opening of the first tubular structure, and a second tubular structure having a second inner volume and a second inner perimeter, wherein: (i) a first opening of the second tubular structure is disposed between a second gas nozzle and a second target, wherein the second gas nozzle is configured to expel gas towards the second target, (ii) the second perimeter is selected such that capillary action can be induced to fill the second tubular structure with the liquid-based sample material via a second opening of the second tubular structure, and wherein the first inner volume and the second inner volume are substantially the same, and the second opening of the first tubular structure is proximate to the second opening of the second tubular structure.

A2. The dispenser of solution A1, wherein the second openings of the first and second tubular structures are mechanically coupled to a common reservoir for receiving the sample material.

A3. The dispenser of solution A1, wherein the second openings of the first and second tubular structures are oriented towards substantially the same direction.

A4. The dispenser of solution A1, wherein an angle between the first openings of the first and second tubular structures are between 90 and 180 degrees.

A5. The dispenser of solution A1, wherein the first gas nozzle and the first opening of the first tubular structure are arranged such that, when the first gas nozzle expels gas, sample material in the first tubular structure is substantially emptied onto the first target.

A6. The dispenser of solution A1, wherein the second gas nozzle and the first opening of the second tubular structure are arranged such that, when the second gas nozzle expels gas, sample material in the second tubular structure is substantially emptied on to the second target.

A7. The dispenser of solution A1, wherein a cross-sectional shape of the first tubular structure is one of a circle, an oval, and a polygon.

A8. The dispenser of solution A1, wherein the first and second tubular structures are parallel to each other.

A9. A system for sample analysis, comprising: a first gas nozzle configured to expel gas towards a first target; a second gas nozzle configured to expel gas towards a second target; a target holder arranged to hold the first and second targets; and a sample dispenser for dispensing substantially the same volume of liquid-based sample material to the plurality of targets, the dispenser comprising: a first tubular structure having a first inner volume and a first inner perimeter, wherein: (i) a first opening of the first tubular structure is disposed between the first gas nozzle and the first target; and (ii) the first perimeter is selected such that capillary action can be induced to fill the first tubular structure with the liquid-based sample material via a second opening of the first tubular structure, and a second tubular structure having a second inner volume and a second inner perimeter, wherein: (i) a first opening of the second tubular structure is disposed between the second gas nozzle and the second target, (ii) the second perimeter is selected such that capillary action can be induced to fill the second tubular structure with the liquid-based sample material via a second opening of the second tubular structure, and wherein the first inner volume and the second inner volume are substantially the same, and the second opening of the first tubular structure is proximate to the second opening of the second tubular structure.

A10. The system of solution A9, further comprising a sample dispenser holder arranged to hold the sample dispenser over the plurality of targets.

A11. The system of solution A9, wherein the sample dispenser is replaceable.

A12. The system of solution A9, wherein the second openings of the first and second tubular structures are mechanically coupled to a common reservoir for receiving the sample material.

A13. The system of solution A9, wherein the second openings of the first and second tubular structures are oriented towards substantially the same direction.

A14. The system of solution A9, wherein an acute angle between the first openings of the first and second tubular structures are between 90 and 180 degrees.

A15. The system of solution A9, wherein the first gas nozzle and the first opening of the first tubular structure are arranged such that, when the first gas nozzle expels gas, sample material in the first tubular structure is substantially emptied onto the first target.

A16. The system of solution A9, wherein the second gas nozzle and the first opening of the second tubular structure are arranged such that, when the second gas nozzle expels gas, sample material in the second tubular structure is substantially emptied on to the second target.

A17. The system of solution A9, wherein a cross-sectional shape of the first tubular structure is one of a circle, an oval, or a polygon.

A18. The system of solution A9, wherein the first and second tubular structures are parallel to each other.

In some embodiments, the following technical solutions, based on the descriptions provided herein, may be implemented:

B1. An apparatus for dispensing a fluidic sample, comprising: an inlet port to input a sample material; and a first sample nozzle and a second sample nozzle fluidically coupled to the inlet port to expel the sample material, wherein a tubular junction fluidically couples the inlet port to a first tubular fluid path that terminates in the first sample nozzle and to a second tubular fluid path that terminates in the second sample nozzle, wherein a cross-sectional area of the tubular junction is less than an average cross-sectional area of the first tubular fluid path and the second tubular fluid path, and wherein the cross-sectional area of the tubular junction is selected to draw the sample material from the inlet port into the tubular junction via capillary action.

B2. The apparatus of solution B1, wherein the first sample nozzle is disposed between a first gas nozzle and a first target, and wherein the first sample nozzle expels the sample material towards the first target upon the first gas nozzle being activated and expelling gas towards the first sample nozzle.

B3. The apparatus of solution B1, wherein a depth and a shape of the inlet port is selected to increase a draw of the sample material into the tubular junction.

B4. The apparatus of solution B1, wherein the inlet port comprises a notch to enable an addition of a buffer solution to the sample material.

B5. The apparatus of solution B4, wherein the buffer solution is actively mixed with the sample material using an active-mixing means.

B6. The apparatus of solution B4, wherein the active-mixing means comprises at least one of a flow pulsation process, an acoustic mixing process, an ultrasonic mixing process or a micro-scale fan.

B7. The apparatus of any of solutions B4 to B6, wherein the buffer solution is a phosphate-buffered saline solution.

B8. The apparatus of solution B1, wherein the first sample nozzle and the second sample nozzle are oriented in the same direction.

B9. The apparatus of solution B8, wherein at least a portion of the first tubular fluid path is parallel to at least a portion of the second tubular fluid path.

B10. The apparatus of solution B1, wherein a cross-sectional area of the first tubular fluid path is uniform across its length.

B11. The apparatus of solution B1, wherein a cross-sectional area of the first tubular fluid path increases from the tubular junction to a mid-point of the first tubular path and decreases from the mid-point to the first sample nozzle.

B12. The apparatus of solution B1, further comprising: a grip portion adjacent to the inlet port at an end opposite from the first sample nozzle and the second sample nozzle.

B13. The apparatus of solution B12, wherein the grip portion comprises an indentation.

B14. A hood for improving deposition of a sample material on a target in a sample analysis system, the hood comprising: a body comprising a top panel, a front panel, a left panel, a right panel and a back panel, wherein the top panel comprises a first opening configured to receive the sample material; a lower panel, positioned adjacent to the back panel, that is parallel to the top panel and perpendicular to the back panel, wherein the lower panel comprises a second opening to receive a stain or dye subsequent to the deposition of the sample material on the target; and a bottom rim that supports the body and the lower panel, wherein the bottom rim is configured to adhere to the target prior to the deposition.

B15. The hood of solution B14, wherein the first opening is raised above the top panel, and wherein the top panel extends beyond the front panel.

B16. The hood of solution B14, wherein the back panel comprises a notch configured to securely affix the hood to a sample analysis system.

B17. The hood of solution B14, wherein the bottom rim comprises a clamp configured to improve a seal between the bottom rim and the target.

The components described above are meant to exemplify some types of possibilities. In no way should the aforementioned examples limit the scope of the technology, as they are only embodiments.

From the foregoing, it will be appreciated that specific embodiments of the invention have been described herein for purposes of illustration, but that various modifications may be made without deviating from the scope of the invention.

What is claimed is:

1. A sample dispenser for dispensing substantially a same volume of liquid-based sample material to a plurality of targets, the sample dispenser comprising:

an inlet port to receive the liquid-based sample material;

a first tubular structure having a first inner volume and a first inner perimeter, wherein:

(i) a first opening of the first tubular structure is disposed between a first gas nozzle and a first target, wherein the first gas nozzle is configured to expel gas towards the first target, and (ii) the first inner perimeter is selected such that capillary action can be induced to fill the first tubular structure with the liquid-based sample material via a second opening of the first tubular structure;

a second tubular structure having a second inner volume and a second inner perimeter, wherein:

(i) a first opening of the second tubular structure is disposed between a second gas nozzle and a second target, wherein the second gas nozzle is configured to expel gas towards the second target, and (ii) the second inner perimeter is selected such that capillary action can be induced to fill the second tubular structure with the liquid-based sample material via a second opening of the second tubular structure; and a tubular junction that fluidically couples the inlet port to the first tubular structure and the second tubular structure, wherein an average cross-sectional area of the tubular junction is less than an average cross-sectional area of the first tubular structure and the second tubular structure, wherein the first inner volume and the second inner volume are substantially same, and wherein the second opening of the first tubular structure is proximate to the second opening of the second tubular structure.

2. The sample dispenser of claim 1, wherein the second opening of the first tubular structure and the second opening of the second tubular structure are oriented towards substantially a same direction.

3. The sample dispenser of claim 1, wherein an angle between the first opening of the first tubular structure and the first opening of the second tubular structure is between 90 and 180 degrees.

4. The sample dispenser of claim 1, wherein the first gas nozzle and the first opening of the first tubular structure are arranged such that, when the first gas nozzle expels gas, the liquid-based sample material in the first tubular structure is substantially emptied onto the first target.

5. The sample dispenser of claim 1, wherein the second gas nozzle and the first opening of the second tubular structure are arranged such that, when the second gas nozzle expels gas, the liquid-based sample material in the second tubular structure is substantially emptied on to the second target.

6. The sample dispenser of claim 1, wherein a cross-sectional shape of the first tubular structure is one of a circle, an oval, and a polygon.

7. The sample dispenser of claim 1, wherein the first tubular structure and the second tubular structure are parallel to each other.

8. The sample dispenser of claim 1, wherein a cross-sectional area of the first tubular structure varies over a length of the first tubular structure.

9. The sample dispenser of claim 1, wherein a cross-sectional area of the first tubular structure remains constant over a length of the first tubular structure.

10. The sample dispenser of claim 1, wherein inner surfaces of the first tubular structure and the second tubular structure are coated with a hydrophobic material.

11. The sample dispenser of claim 1, wherein inner surfaces of the first tubular structure and the second tubular structure are coated with a hydrophilic material.

12. The sample dispenser of claim 1, wherein the inlet port comprises a conical shape, a pyramidical shape, a prismatic shape, or a cylindrical shape.

13. The sample dispenser of claim 1, further comprising:
a grip portion adjacent to the inlet port and at an end opposite from the first opening of the first tubular structure and the first opening of the second tubular structure, wherein the grip portion comprises an indentation.

14. The sample dispenser of claim 1, wherein the inlet port comprises a notch that enables a buffer solution to be passively added to the liquid-based sample material.

15. The sample dispenser of claim 1, wherein the second opening of the first tubular structure and the second opening of the second tubular structure are mechanically coupled to the inlet port.

16. The sample dispenser of claim 15, wherein a volume of the inlet port ranges between 5 μL (microliters) and 150 μL.

* * * * *